(12) United States Patent
Jung et al.

(10) Patent No.: US 11,405,493 B2
(45) Date of Patent: Aug. 2, 2022

(54) ANTENNA AND ELECTRONIC DEVICE INCLUDING SAME

(71) Applicant: Samsung Electronics Co., Ltd., Suwon-si (KR)

(72) Inventors: Hojin Jung, Suwon-si (KR); Yongyoun Kim, Suwon-si (KR); Jaesung Shim, Suwon-si (KR); Myeongsu Oh, Suwon-si (KR); Duho Chu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/288,327

(22) PCT Filed: Oct. 23, 2019

(86) PCT No.: PCT/KR2019/013976
§ 371 (c)(1),
(2) Date: Apr. 23, 2021

(87) PCT Pub. No.: WO2020/085791
PCT Pub. Date: Apr. 30, 2020

(65) Prior Publication Data
US 2021/0377372 A1    Dec. 2, 2021

(30) Foreign Application Priority Data
Oct. 24, 2018  (KR) .......................... 10-2018-0127508

(51) Int. Cl.
*H04M 1/02*   (2006.01)
*H01Q 1/24*   (2006.01)
*H04B 1/3888* (2015.01)

(52) U.S. Cl.
CPC .......... *H04M 1/0216* (2013.01); *H01Q 1/243* (2013.01); *H04B 1/3888* (2013.01); *H04M 1/0249* (2013.01); *H04M 1/0268* (2013.01)

(58) Field of Classification Search
CPC ............ H04M 1/0216; H04M 1/0249; H04M 1/0268; H01Q 1/246; H04B 1/3888
See application file for complete search history.

(56) References Cited

U.S. PATENT DOCUMENTS 10,485,115 B1 * 11/2019 Cromer ..................... E05D 7/00
2003/0045246 A1   3/2003 Lee et al.
(Continued)

FOREIGN PATENT DOCUMENTS

EP    3 343 693 A1    7/2018
GN    106848679 A    6/2017
(Continued)

OTHER PUBLICATIONS

European Search Report dated Nov. 11, 2021, issued in European Application No. 19875172.9.

*Primary Examiner* — Ankur Jain
*Assistant Examiner* — Angelica M Perez
(74) *Attorney, Agent, or Firm* — Jefferson IP Law, LLP

(57) ABSTRACT

An electronic device is provided, the device comprising a foldable housing comprising a hinge structure, a first housing structure connected thereto and including a first surface facing in a first direction, a second surface facing in a second direction opposite the first direction, and a first side member encompassing a space between the first and second surfaces and including at least one first conductive part, and a second housing structure connected to the hinge structure, including a third surface facing in a third direction, a fourth surface facing in a fourth direction opposite the third direction, and a second side member encompassing a space between the third and fourth surfaces and including at least one second (Continued)

conductive part, and folded with the first housing structure around the hinge structure. A flexible display extends from the first surface to the third surface, and a wireless communication circuit electrically connects to the second conductive part and is configured to transmit or receive a signal having a specified frequency. The first surface faces the third surface in a folded state, the third direction is the same as the first direction in an unfolded state, and the first conductive part and the second conductive part are electrically connected in the folded state.

11 Claims, 19 Drawing Sheets

(56) References Cited

U.S. PATENT DOCUMENTS

| | | |
|---|---|---|
| 2003/0129950 A1 | 7/2003 | Kwak |
| 2012/0194394 A1* | 8/2012 | Togashi ............... H01Q 1/243 343/702 |
| 2015/0171916 A1 | 6/2015 | Asrani et al. |
| 2016/0373154 A1* | 12/2016 | Barbarossa ........... C22C 29/065 |
| 2018/0366813 A1 | 12/2018 | Kim et al. |
| 2019/0007533 A1 | 1/2019 | Kim et al. |

FOREIGN PATENT DOCUMENTS

| | | |
|---|---|---|
| JP | 2005-190064 A | 7/2005 |
| KR | 10-0401192 B1 | 10/2003 |
| KR | 10-0438123 B1 | 7/2004 |
| KR | 10-2006-0122239 A | 11/2006 |
| KR | 10-2008-0019326 A | 3/2008 |
| KR | 10-2010-0084757 A | 7/2010 |
| KR | 10-2013-0062210 A | 6/2013 |
| KR | 10-1286971 B1 | 7/2013 |
| KR | 20170066944 * | 7/2015 |
| KR | 10-1586288 B1 | 1/2016 |
| KR | 10-1621422 B1 | 5/2016 |
| KR | 10-2017-0056292 A | 5/2017 |
| KR | 10-2017-0066944 A | 6/2017 |
| WO | WO95/08910 * | 3/1995 |

* cited by examiner

ANTENNA AND ELECTRONIC DEVICE INCLUDING SAME

TECHNICAL FIELD

Various embodiments of the disclosure relate to an antenna and an electronic device including the same.

BACKGROUND ART

In line with the development of electronic communication technology, electronic devices having a variety of functions are being introduced. These electronic devices generally have a convergence function of complexly performing one or more functions.

As the difference in functions of recent electronic devices between manufactures is significantly reduced, the electronic devices are gradually becoming slimmer while strengthening design thereof in order to satisfy consumers' purchase desires.

DISCLOSURE OF INVENTION

Technical Problem

Rotating type (e.g., foldable type, slide type, swivel type, etc.) electronic devices in which at least two housings rotatably operate by a connector are emerging. For example, the rotating type electronic device may be configured such that at least two housings are disposed to overlap each other, and the operation thereof may degrade radiation performance of an antenna provided in one housing due to a metal member provided to correspond thereto in the other housing overlapping the same.

According to an embodiment of the disclosure, it is possible to provide an antenna capable of preventing degradation in performance of an antenna, which is caused by overlapping of housings, and an electronic device including the same.

Solution to Problem

According to an embodiment of the disclosure, an electronic device may include: a foldable housing including a hinge structure, a first housing structure connected to the hinge structure and including a first surface facing in a first direction, a second surface facing in a second direction opposite the first direction, and a first side member surrounding at least a portion of a space between the first surface and the second surface and including at least one first conductive part, and a second housing structure connected to the hinge structure, including a third surface facing in a third direction, a fourth surface facing in a fourth direction opposite the third direction, and a second side member surrounding at least a portion of a space between the third surface and the fourth surface and including at least one second conductive part, and configured to be folded against the first housing structure around the hinge structure, wherein the first surface faces the third surface in a folded state and the third direction is the same as the first direction in an unfolded state; a flexible display extending from the first surface to the third surface; and a wireless communication circuit electrically connected to the at least one second conductive part and configured to transmit and/or receive a signal of a specified frequency, wherein the at least one first conductive part and the at least one second conductive part may be electrically connected to each other in the folded state.

Advantageous Effects of Invention

In an electronic device including an antenna according to an embodiment of the disclosure, at least one second conductive part, which is included in a second housing structure and used as an antenna, may be electrically connected to at least one first conductive part of a first housing structure adjacent thereto in a folded state of the electronic device, thereby reducing degradation in antenna radiation performance, which may occur in the folded state.

In addition, effects obtainable or predictable by means of various embodiments of the disclosure will be directly or implicitly disclosed in the detailed description of the embodiments of the disclosure. For example, various effects predicted according to various embodiments of the disclosure will be disclosed in the detailed description, which will be described later.

BEST MODE FOR CARRYING OUT THE INVENTION

Hereinafter, various embodiments of the document will be described with reference to the accompanying drawings.

Figure 1:
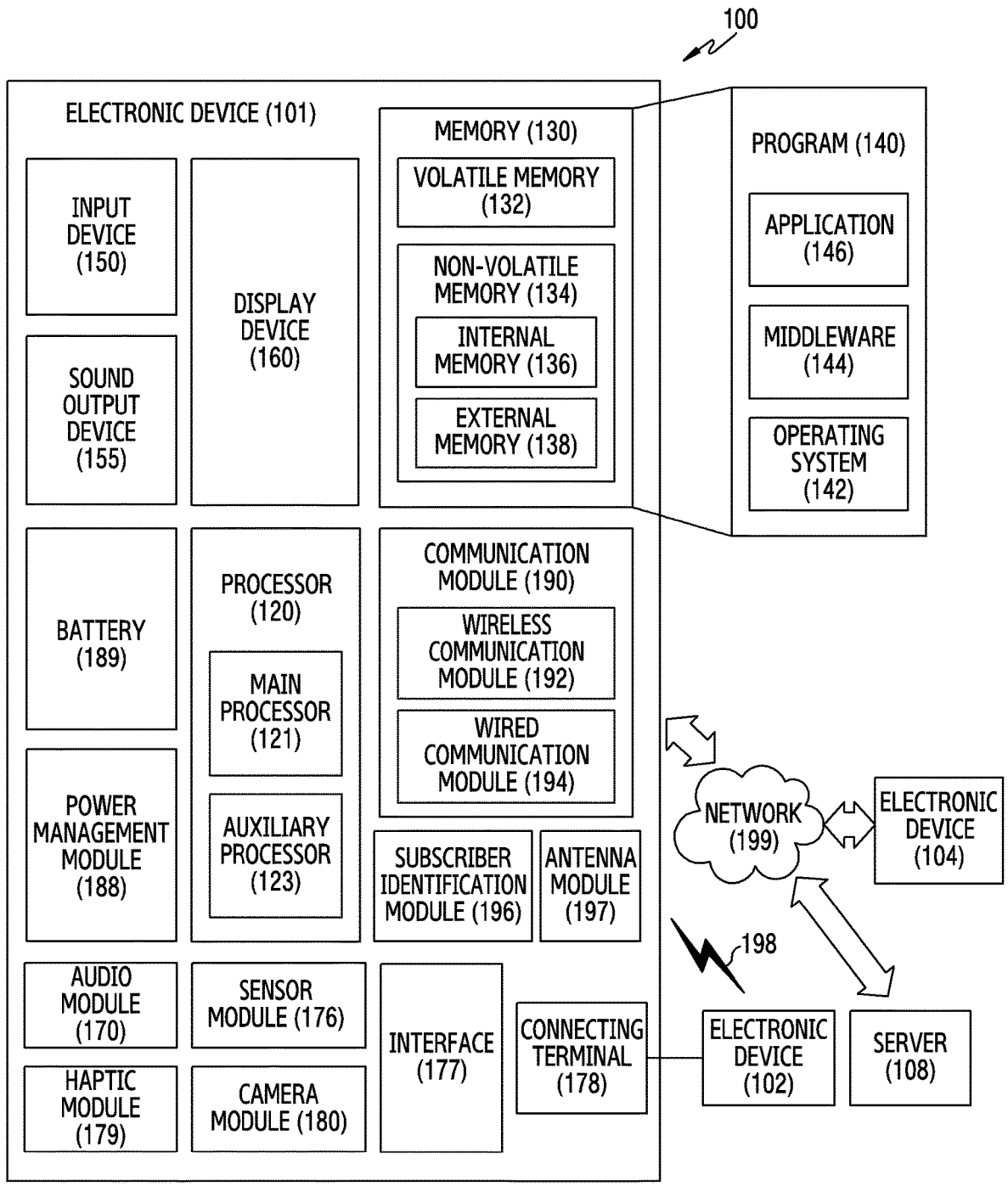
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include at least one of, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may be formed as a conductive material or a conductive pattern, and according to some embodiments, may further include other components (e.g., RFIC) in addition to the conductive material or the conductive pattern. According to an embodiment, the antenna module 197 may include one or more antennas. In such a case, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
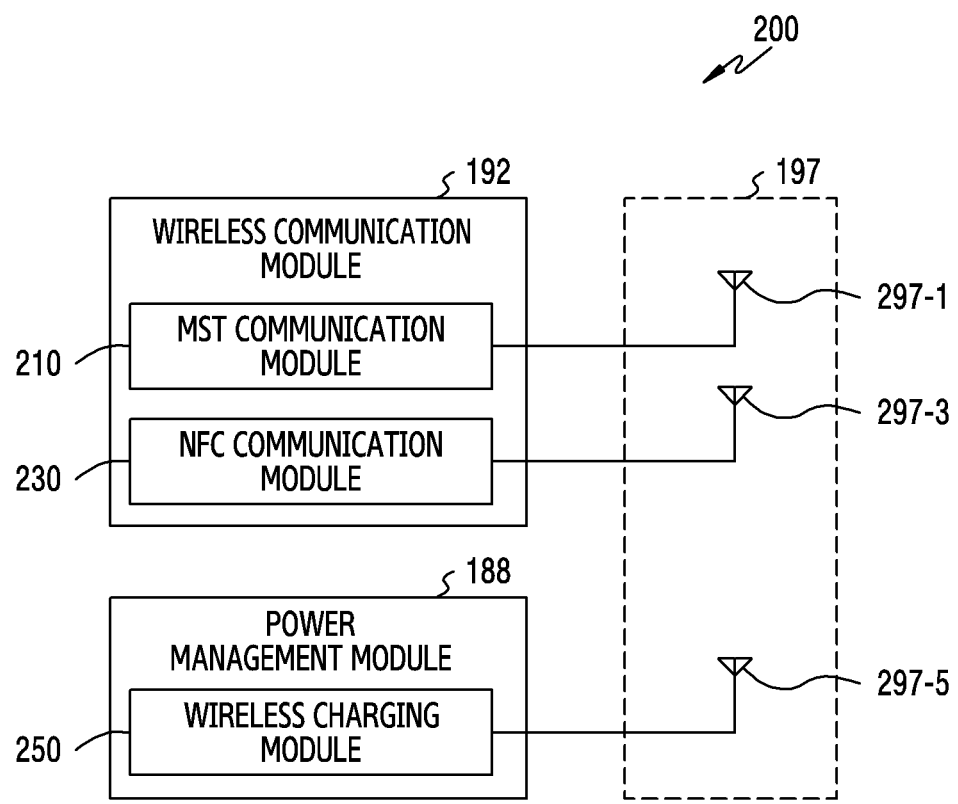
FIG. 2 is a block diagram illustrating a wireless communication module, a power management module, and an antenna module included in the electronic device in FIG. 1 according to an embodiment.

FIG. 2 is a block diagram 200 illustrating the wireless communication module 192, the power management module 188, and the antenna module 197 of the electronic device 101 according to an embodiment.

Referring to FIG. 2, according to an embodiment, the wireless communication module 192 may include a magnetic secure transmission (MST) communication module 210 or a near-field communication (NFC) module 230, and the power management module 188 may include a wireless charging module 250. In such a case, the antenna module 297 may include separately a plurality of antennas that include an MST antenna 297-1 connected with the MST communication module 210, an NFC antenna 297-3 connected with the NFC communication module 230, and a wireless charging antenna 297-5 connected with the wireless charging module 250. For ease of description, the same components as those described in regard to FIG. 2 are briefly described or omitted from the description.

The MST communication module 210 may receive a signal (e.g., a signal containing control information or payment information such as card information) from the processor 120, generate a magnetic signal corresponding to the received signal, and then transfer the generated magnetic signal to the external electronic device (e.g., the electronic device 102 of FIG. 1) (e.g., POS device) via the MST antenna 297-1. According to an embodiment, for example, the MST communication module 210 may include a switching module (not shown) that includes one or more switches connected with the MST antenna 297-1, and control the switching module to change the direction of voltage or current supplied to the MST antenna 297-1. This is emitted via the MST antenna 297-1, for example, through wireless short-range communication (e.g., the first network 198 of FIG. 1) changing the direction of the magnetic signal (e.g., a magnetic field) transmitted to external device 102. The magnetic signal transmitted in a state in which the direction is changed may cause a shape and effect similar to a magnetic field generated when the magnetic card is swiped by a card reader of the electronic device 102. According to an embodiment, for example, payment-related information and a control signal that are received by the electronic device 102 in the form of the magnetic signal may be further transmitted to payment server (e.g., the server 108 of FIG. 1) via the network (e.g., the second network 199 of FIG. 1).

According to an embodiment, the NFC communication module 230 may obtain a signal (e.g., a signal containing control information or payment information such as card information) from the processor 120 (e.g., the processor 120 of FIG. 1) and transmit the obtained signal to the external electronic device (e.g., the electronic device 102 of FIG. 1) via the NFC antenna 297-3. According to an embodiment, the NFC communication module 230 may receive a signal (e.g., a signal containing control information or payment information such as card information) transmitted from the external electronic device 202 via the NFC antenna 297-3.

The wireless charging module 250 may wirelessly transmit power to the external electronic device 12 (e.g., the electronic device 102 of FIG. 1) (e.g., a cellular phone or wearable device) via the wireless charging antenna 297-5, or wirelessly receive power from the external electronic device (e.g., the electronic device 102 of FIG. 1) (e.g., a wireless charging device). The wireless charging module 250 may support various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. When the MST antenna 297-1, NFC antenna 297-3, or wireless charging antenna 297-5 share at least some area of the radiator, the antenna module (e.g. the wireless communication module 192) (e.g., MST communication module 210 or NFC module 230) may include a switching circuit (not shown) to selectively connect or disconnect (e.g., open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 (e.g., the electronic device 102 of FIG. 1) uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least some function of the MST communication module 210, the NFC communication module 230, or the wireless charging module 250 may be controlled by an external processor (e.g., the processor 120 of FIG. 1). According to an embodiment, specified function (e.g., a payment function) of the MST communication module 210 or the NFC communication module 230 may be performed in a trusted execution environment (trusted execution environment, TEE). According to various embodiments, the trusted execution environment (TEE) may be allocated, for example, at least some designated area of the memory 130 (e.g., memory 130 of FIG. 1) to perform a function (e.g., a financial transaction or personal information-related function) that requires a relatively high level of security, and access to the designated area may be restrictively permitted execution environment, for example, according to an accessing entity or an application being executed.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
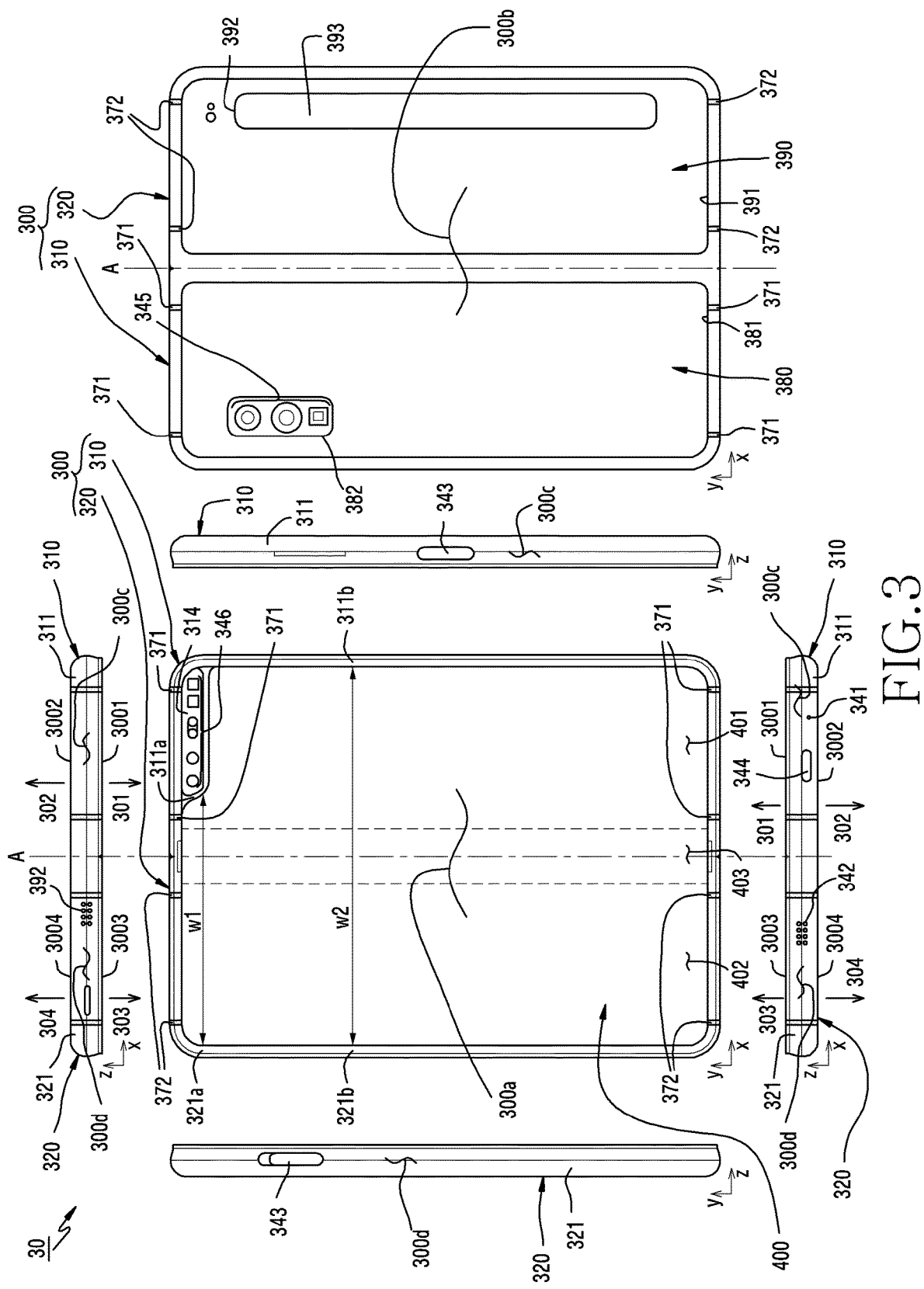
FIG. 3 is a diagram illustrating an unfolded state of an electronic device according to an embodiment.
Figure 4:
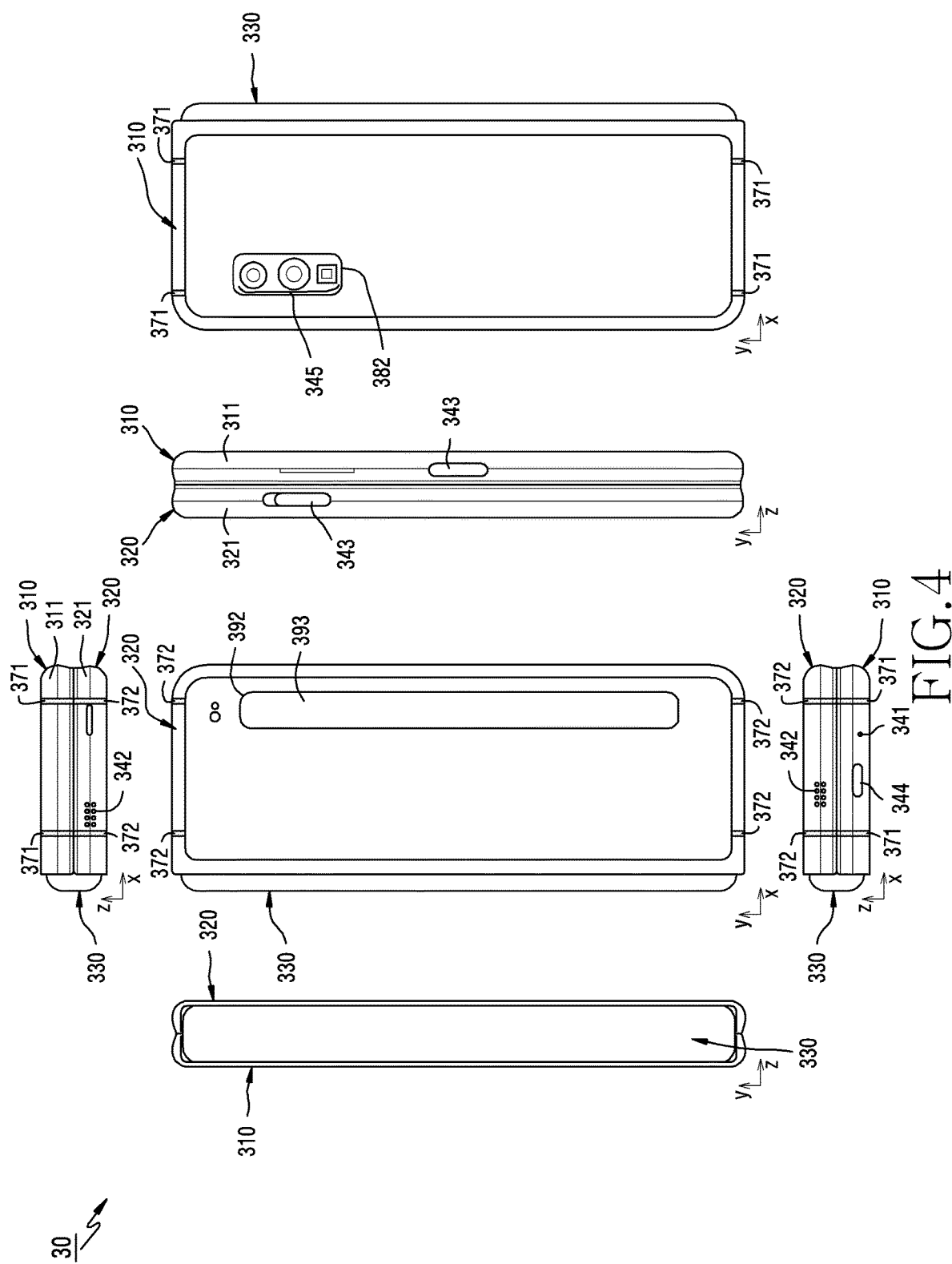
FIG. 4 is a diagram illustrating a folded state of an electronic device according to an embodiment.

FIG. 3 is a diagram illustrating an unfolded (or flat) state of an electronic device according to an embodiment. FIG. 4 is a diagram illustrating a folded state of an electronic device according to an embodiment.

Referring to FIGS. 3 and 4, in an embodiment, an electronic device 30 (e.g., the electronic device 101 in FIG. 1) may include a foldable housing 300, a hinge cover 330 covering foldable parts of the foldable housing 300, and a flexible or foldable display 400 (hereinafter, abbreviated as a "display 400") (e.g., the display device 160 in FIG. 1) disposed in the space formed by the foldable housing 300. According to an embodiment, the foldable housing 300 may include a front surface 300a through which the display 400 is exposed, a rear surface 300b facing in the opposite direction of the front surface 300a, and side surfaces 300c and 300d surrounding the space between the front surface 300a and the rear surface 300b.

According to an embodiment, the foldable housing 300 may include a first housing structure 310 and a second housing structure 320 connected by a hinge structure (not shown). For example, in the hinge structure, the first housing structure 310 may be rotatably connected to the second housing structure 320 by the hinge structure.

According to an embodiment, the first housing structure 310 may include a first surface 3001 facing in a first direction 301, a second surface 3002 facing in a second direction 302 opposite the first direction 301, and a first side surface 300c surrounding at least a portion of the space between the first surface 3001 and the second surface 3002. The second housing structure 320 may include a third surface 3003 facing in a third direction 303, a fourth surface 3004 facing in a fourth direction 304 opposite the third direction 303, and the second side surface 300d surrounding at least a portion of the space between the third surface 3003 and the fourth surface 3004. The front surface 300a of the electronic device 30 may include the first surface 3001 and the third surface 3003, and the rear surface 300b of the electronic device 30 may include the second surface 3002 and the fourth surface 3004. In various embodiments (not shown), the first housing structure 310 may refer to a structure forming a portion of the first surface 3001, the second surface 3002, and the first side surface 300c. In various embodiments (not shown), the second housing structure 320 may refer to a structure forming a portion of the third surface 3003, the fourth surface 3004, and the second side surface 300d.

According to an embodiment, the foldable housing 300 may include a transparent plate (not shown) (e.g., a polymer plate including various coating layers) forming the first surface 3001 and the third surface 3003. The display 400 may be disposed along the transparent plate, and may be exposed through the first surface 3001 and the third surface 3003. The transparent plate may have flexibility to enable a folded state of the electronic device 30. According to an embodiment, the display 400 may be implemented to include the transparent plate, and the transparent plate may be omitted from the foldable housing 300.

According to an embodiment, the first housing structure 310 may include a first rear cover 380 disposed on one side of the folding axis A and forming at least a portion of the second surface 3002. For example, the first rear cover 380 may have a substantially rectangular periphery 381, and the periphery 381 may be surrounded by the first side member 311. According to various embodiments, the first side member 311 and the first rear cover 380 may be integrally formed with each other, and may include the same material.

According to an embodiment, the second housing structure 320 may include a second rear cover 390 disposed on the opposite side of the folding axis A and forming at least a portion of the fourth surface 3004. For example, the second rear cover 390 may have a substantially rectangular periphery 391, and the periphery 391 may be surrounded by the second side member 321. According to various embodiments, the second side member 321 and the second rear cover 390 may be integrally formed with each other, and may include the same material.

According to various embodiments, the first rear cover 380 and/or the second rear cover 390 may be formed by, for example, coated or colored glass, ceramic, polymer, metal (e.g., aluminum, stainless steel (STS), or magnesium), or a combination of at least two thereof.

According to an embodiment, the first rear cover 380 and the second rear cover 390 may be substantially symmetrical about the folding axis A. The first rear cover 380 and the second rear cover 390 are not necessarily symmetric with each other, and in another embodiment, the first rear cover 380 and/or the second rear cover 390 having various different shapes may be provided.

According to an embodiment, the first housing structure 310 may include a first side member (or a first side bezel structure) 311 forming the first side surface 300c, and the second housing structure 320 may include a second side member (or a second side bezel structure) 321 forming the second side surface 300d. The first side member 311 and/or the second side member 321 may include metal or polymer.

According to various embodiments, the first side member 311 and the second side member 321 may extend to form a periphery area of the front surface 300a. For example, the front surface 300a of the electronic device 30 may be formed by the display 400, and a partial area of the first side member 311 and a partial area of the second side member 321, which are adjacent to the display 400.

According to various embodiments, the partial area (not shown) of the first side member 311, which is adjacent to the periphery 381 of the first rear cover 380, and/or the partial area (not shown) of the second side members 321, which is adjacent to the periphery 391 of the second rear cover 390, may form a portion of the rear surface 300b. For example, the rear surface 300b of the electronic device 30 may be formed by the first rear cover 380, the partial area of the first side member 311 adjacent to the first rear cover 380, the second rear cover 390, and the partial area of the second side member 321 adjacent to the second rear cover 390.

According to an embodiment, the first side member 311 and the second side member 321 may be disposed on both sides about the folding axis A, and may be generally symmetric with respect to the folding axis A.

According to an embodiment, the first housing structure 310 may further include a component mounting area 314 that extends from the first side member 311 or is combined with the first side member 311 so as to form the first surface 3001 together with the display 400. The areas other than the component mounting area 314 in the first side member 311 may be symmetrical with the second side member 321. At least one component utilizing the first surface 3001 may be disposed in the component mounting area 314. According to an embodiment, the component mounting area 314 may be formed to have an area configured to be adjacent to one corner of the first side member 311. According to various embodiments, the arrangement, shape, and size of the component mounting area 314 are not limited to the illustrated example. For example, in another embodiment, the component mounting area 314 may be provided in another corner of the first side member 311 or in an arbitrary area between the upper corner and the lower corner thereof. The components for executing various functions provided in the electronic device 30 may be exposed to the first surface 3001 through the component mounting area 314 or through one or more openings (not shown) provided in the component mounting area 314. According to an embodiment, components 346 disposed in the component mounting area 314 may include at least one of various sensors such as a proximity sensor, a front camera, a luminous element, or a receiver. For example, the luminous element may provide state information of the electronic device 30 in the form of light. In another embodiment, the luminous element may provide, for example, a light source that operates in association with the operation of the front camera. The luminous element, for example, may include an LED, an IR LED, and a xenon lamp.

According to an embodiment, the electronic device 30 may include at least one or more of audio modules 341 and 342, key input devices 343, or a connector hole 344.

According to an embodiment, the audio modules 341 and 342 may include a microphone hole 341 or a speaker hole 342. The microphone hole 341 may have a microphone for obtaining external sound disposed therein, and in some embodiments, a plurality of microphones may be disposed to detect the direction of sound. The speaker hole 342 may include an external speaker hole or a call receiver hole. In some embodiments, the speaker hole 342 and the microphone hole 341 may be implemented as one hole, or a speaker may be provided without the speaker hole 342 (e.g., a piezo speaker).

According to an embodiment, the key input devices 343 may be disposed on the side surfaces 300c and 300d of the foldable housing 300. In another embodiment, the electronic device 30 may exclude some or all of the key input devices 343 mentioned above, and the excluded key input devices 343 may be implemented in other forms such as a soft key (or a software key) or the like in the display 400. In some embodiments, the key input device may include a sensor module disposed on the second surface 3002 of the first housing structure 310 (e.g., one or more of the components 345 disposed in the first rear surface area 382).

According to an embodiment, the connector hole 344 may include a first connector hole capable of accommodating a connector (e.g., a USB connector) for transmitting and receiving power and/or data to and from an external electronic device, and/or a second connector hole (e.g., an earphone jack) capable of accommodating a connector for transmitting and receiving an audio signal to and from an external electronic device. The positions or number of the connector holes are not limited to the example shown in FIG. 3 or 4, and may be configured differently.

In another embodiment (not shown), at least one or more of an audio module (e.g., a call receiver), a sensor module (e.g., a proximity sensor or a fingerprint sensor), a camera module (e.g., a front camera), or a luminous element may be provided on the rear surface of a screen display area of the display 400. In another embodiment (not shown), the display 400 may be connected to a touch detection circuit, a pressure sensor for measuring the strength (pressure) of a touch, and/or a digitizer for detecting a magnetic-field type stylus pen, or may be disposed adjacent thereto.

In an embodiment, both the first housing structure 310 and the second housing structure 320 may form a recess, which is a space in which the display 400 is disposed. In the illustrated embodiment, the recess may have two or more different widths in the direction perpendicular to the folding axis A due to the component mounting area 314.

For example, the recess may have a first width w1 between a first portion 321a of the second side member 321, which is parallel to the folding axis A, and a first portion 311a of the first side member 311, which is formed in the periphery of the component mounting area 314. The recess may have a second width w2 between a second portion 321b of the second side member 321 and the second portion 311b of the first side member 311, which is positioned outside the component mounting area 314 and is parallel to the folding axis A. The second width w2 may be formed to be longer than the first width w1. According to an embodiment, the first portion 311a of the first housing structure 310 and the first portion 321a of the second housing structure 320, which are asymmetric with each other, may form the first width w1 of the recess, and the second portion 311b of the first housing structure 310 and the second portion 321b of the second housing structure 320, which are symmetrical with each other, may form the second width w2 of the recess. According to an embodiment, the first portion 311a and the second portion 311b of the first housing structure 310 may have different distances to the folding axis A. The width of the recess is not limited to the illustrated example. According to various embodiments, the recess may have a plurality of widths due to the shape of the component mounting area 314 or due to the portions that bring about an asymmetric shape between the first housing structure 310 and the second housing structure 320.

According to various embodiments, one or more components may be disposed on the rear surface 300b of the electronic device 30, or may be visually exposed therethrough. For example, at least a portion of a sub-display 393 may be visually exposed through the second rear surface area 392 of the second rear cover 390. For example, one or more components 345 may be visually exposed through the first rear surface area 382 of the first rear cover 380. In various embodiments, the one or more components 345 may include sensors (e.g., a proximity sensor and a heart rate sensor) and/or a rear camera.

Referring to FIG. 4, the hinge cover 330 may be disposed between the first housing structure 310 and the second housing structure 320, thereby covering internal components (e.g., the hinge structure). In an embodiment, the hinge cover 330 may be covered by parts of the first housing structure 310 and the second housing structure 320, or may be exposed to the outside depending on the state of the electronic device 30 (e.g., an unfolded state or a folded state).

For example, as shown in FIG. 3, when the electronic device 30 is in an unfolded state, the hinge cover 330 may be covered by the first housing structure 310 and the second housing structure 320 so as not to be exposed. For example, as shown in FIG. 4, when the electronic device 30 is in a folded state (e.g., a fully folded state), the hinge cover 330 may be exposed to the outside between the first housing structure 310 and the second housing structure 320. For example, when the electronic device 30 is in an intermediate state (e.g., the state between the unfolded state and the folded state) in which the first housing structure 310 and the second housing structure 320 are folded at a certain angle, a part of the hinge cover 330 may be exposed to the outside between the first housing structure 310 and the second housing structure 320. The exposed area of the hinge cover 330 in the intermediate state may be less than the exposed area of the hinge cover 330 in the fully folded state. In an embodiment, the hinge cover 330 may include a curved surface, and the curved surface may form one side surface of the electronic device 30 in the folded state.

According to various embodiments, the display 400 may denote a display in which at least a partial area thereof is able to be transformed into the flat or curved surface. In an embodiment, referring to FIG. 3, the display 400 may include a folding area 403, a first area 401 disposed on one side of the folding area 403 (on the right side of the folding area 403), and a second area 402 disposed on the opposite side thereof (on the left side of the folding area 403).

According to various embodiments, division of the area of the display 400 shown in FIG. 3 is exemplary, and the display 400 may be divided into a plurality of (e.g., 4 or more, or 2) areas depending on the structure or function thereof. For example, although the area of the display 400 may be divided based on the folding area 403 or the folding axis A extending parallel to the y-axis in the embodiment shown in FIG. 3, the area of the display 400, in another embodiment, may be divided based on another folding area (e.g., a folding area parallel to the x-axis) or another folding axis (e.g., a folding axis parallel to the x-axis).

According to an embodiment, the first area 401 and the second area 402 of the display 400 may be substantially symmetrical about the folding area 403. According to an embodiment, unlike the second area 402, the first area 401 may include a notch that is cut away due to the presence of the component mounting area 314, but may be symmetrical with second area 402 about the folding area 403 in other areas. For example, the first area 401 and the second area 402 may include portions, which are symmetrical with each other, and portions, which are asymmetrical with each other, based on the folding area 403.

According to an embodiment, the angle or distance between the first housing structure 310 and the second housing structure 320 may vary depending on the unfolded state, the folded state, or the intermediate state of the foldable housing 300. Hereinafter, the operation of the first housing structure 310 and the second housing structure 320 depending on the state of the electronic device 30 (e.g., the unfolded state and the folded state) and respective areas of the display 400 will be described.

According to an embodiment, when the electronic device 30 is in the unfolded state (see FIG. 3), the first direction 301 in which the first surface 3001 of the first housing structure 310 faces may be the same as the third direction 303 in which the third surface 3003 of the second housing structure 320 faces. For example, in the unfolded state, the first surface 3001 of the first housing structure 310 and the third surface 3003 of the second housing structure 320 may be disposed to form an angle of about 180 degrees and face in the same direction (e.g., the direction toward the front surface 300a of the electronic device 30). In the unfolded state of the electronic device 30, the surface of the first area 401 and the surface of the second area 402 of the display 400 may form an angle of about 180 degrees, and may face in the same direction (e.g., the direction toward the front surface 300a of the electronic device 30). The folding area 403 of the display 400 may form substantially the same plane as the first area 401 and the second area 402.

In an embodiment, when the electronic device 30 is in the folded state (see FIG. 4), the first housing structure 310 and the second housing structure 320 may be disposed to face each other. For example, in the folded state, the first surface 3001 of the first housing structure 310 and the third surface 3003 of the second housing structure 320 may face each other. In the folded state, the surface of the first area 401 and the surface of the second area 402 of the display 400 may form a narrow angle (e.g., between about 0 degrees and 10 degrees) while facing each other. In the folded state, the folding area 403 may have a curved surface of a predetermined curvature in at least a portion thereof.

In an embodiment, when the electronic device 30 is in the intermediate state (e.g., the state between the unfolded state and the folded state), the first housing structure 310 and the second housing structure 320 may be folded at a certain angle therebetween. In the intermediate state, the first surface 3001 of the first housing structure 310 and the second surface 3002 of the second housing structure 320, or the surface of the first area 401 and the surface of the second area 402 of the display 400 may form an angle, which is greater than that in the folded state and is less than that in the unfolded state. In the intermediate state, at least a portion of the folding area 403 may be formed to have a curved surface of a predetermined curvature, and the curvature may be smaller than that in the folded state.

According to an embodiment, the first side member 311 may include a plurality of first conductive parts (not shown) that are physically or electrically separated from each other. Non-conductive members 371 may be disposed in the gaps (or slits) (not shown) between the plurality of first conductive parts. According to an embodiment, the non-conductive members 371 may extend from a non-conductive first inner structure (not shown) disposed inside the first housing structure 310. The first inner structure may be connected to the first side member 311, whereby the plurality of first conductive parts may be maintained to be physically separated by the first inner structure. For example, the first inner structure may be formed to be connected to the first side member 311 by insert injection.

According to an embodiment, the second side member 321 may include a plurality of second conductive parts (not shown) that are physically or electrically separated. Non-conductive members 372 may be disposed in the gaps (not shown) between the plurality of second conductive parts. According to an embodiment, the non-conductive members 372 may extend from a non-conductive second inner structure (not shown) disposed in the second housing structure 320. The second inner structure may be connected to the second side member 321, whereby the plurality of second conductive parts may be maintained to be physically separated by the second inner structure. For example, the second inner structure may be formed to be connected to the second side member 321 by insert injection.

According to an embodiment, at least one of the plurality of first conductive parts of the first side member 311 may be electrically connected to a wireless communication circuit (e.g., the wireless communication module 192 in FIG. 1), and may be used as an antenna (or an antenna radiator).

Referring to FIG. 4, when the electronic device 30 is in the folded state, the first side member 311 and the second side member 321 may be adjacent to each other, and wireless communication using at least one first conductive part as an antenna may be electrically affected by the second side member 321. For example, in the folded state, the second side member 321 may deteriorate the performance of wireless communication (e.g., antenna radiation performance) using at least one first conductive part as an antenna. For example, the electromagnetic wave energy (or electromagnetic field) emitted from at least one first conductive part used as an antenna may be disrupted by the second side member 321. According to an embodiment, in order to reduce the electrical influence, the gaps between the plurality of first conductive parts of the first side member 311 and the gaps between the plurality of second conductive parts of the second side member 321 may be designed to be aligned with each other in the folded state.

Referring to FIG. 4, although the alignment of the gaps between the plurality of first conductive parts of the first side member 311 and the gaps between the plurality of second conductive parts of the second side member 321 is able to improve the antenna radiation performance in the folded state, it may be difficult to obtain antenna radiation performance of a configured value or more due to the electromagnetic coupling between the first conductive part and the second conductive part adjacent to each other. For example, capacitance may be generated between the first conductive part and the second conductive part due to electromagnetic coupling in the folded state, and thus the electromagnetic wave energy (or electromagnetic field) emitted from the first conductive part used as an antenna may be induced to the second conductive part. Unlike the forward current flowing through the first conductive part, a reverse current may be generated in the second conductive part by the induced electromagnetic wave energy, which may deteriorate the antenna radiation performance in wireless communication using at least one first conductive part as an antenna. According to an embodiment, the electronic device 30 may include at least one conductive member electrically connecting between at least one first conductive part used as an antenna and at least one second conductive part aligned therewith in the folded state.

According to an embodiment, at least one conductive member may be disposed in at least a portion between the first side member 311 and the second side member 321 in the folded state. For example, the first side member 311 may include a partial area extending to the first surface (the first surface 3001 in FIG. 3), and the second side member 321 may include a partial area extending to the third surface (the third surface 3003 in FIG. 3). In the folded state, at least one conductive member may be disposed between the partial area of the first side member 311 and the partial area of the second side member 321.

According to an embodiment, if the first conductive part used as an antenna and at least one second conductive part aligned therewith are electrically connected by at least one conductive member in the folded state, a forward current may flow through the second conductive part, similarly to the first conductive part. As a result, electromagnetic coupling between the first conductive part and the second conductive part, which are adjacent to each other, may be reduced in the folded state, thereby ensuring configured antenna radiation performance. According to an embodiment, in the folded state, current may flow from the first conductive part to the second conductive part through at least one conductive member, and the second conductive part may operate as an antenna together with the first conductive part.

Figure 5:
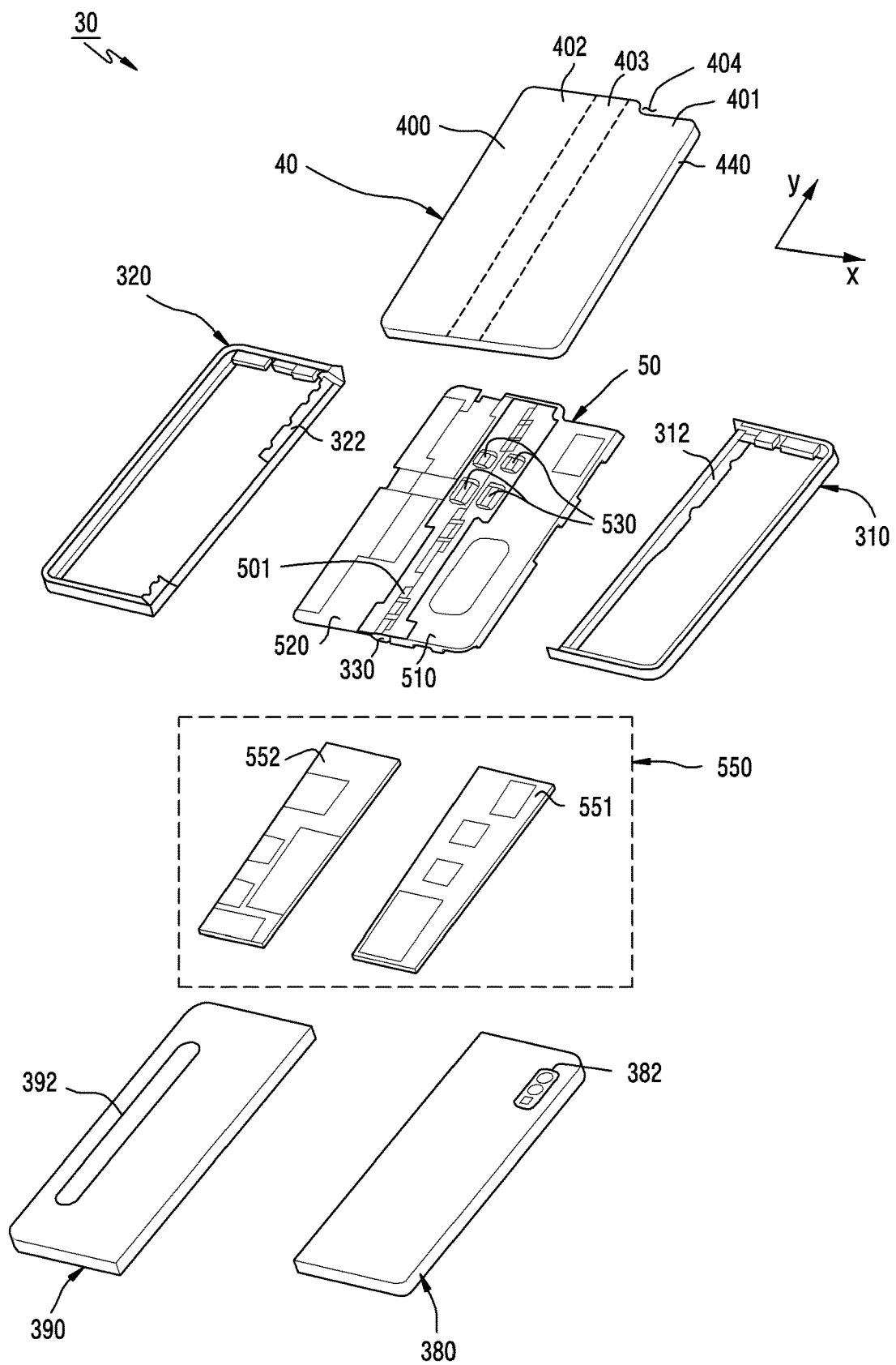
FIG. 5 is an exploded perspective view of the electronic device shown in FIG. 3 or 4 according to an embodiment.

FIG. 5 is an exploded perspective view of the electronic device 30 shown in FIG. 3 or 4 according to an embodiment.

Referring to FIG. 5, in an embodiment, the electronic device 30 may include at least one of a display unit 40, a bracket assembly 50, a substrate 550, a first housing structure 310, a second housing structure 320, a first rear cover 380, or a second rear cover 390. In this document, the display unit 40 may be referred to as a display module or a display assembly.

The display unit 40, for example, may include a display 400 and one or more plates or layers 440 on which the display 400 is mounted. In an embodiment, the plate 440 may be disposed between the display 400 and the bracket assembly 50. The display 400 may be disposed in at least a portion of one surface of the plate 440 (e.g., the upper surface in FIG. 5). The plate 440 may be formed to have a shape corresponding to the display 400. For example, the partial area of the plate 440 may be formed to have a shape corresponding to the notch 404 of the display 400.

According to an embodiment, the bracket assembly 50 may include a first bracket 510, a second bracket 520, a hinge structure 501 disposed between the first bracket 510 and the second bracket 520, a hinge cover 330 covering the hinge structure 501 against the outside, and a wiring member 530 (e.g., a flexible printed circuit (FPC)) crossing the first bracket 510 and the second bracket 520.

In an embodiment, the bracket assembly 50 may be disposed between the plate 440 and the substrate 550. For example, the first bracket 510 may be disposed between the first area 401 of the display 400 and the first substrate 551 (e.g., a first printed circuit board (PCB)). The second bracket 520 may be disposed between the second area 402 of the display 400 and the second substrate 552 (e.g., the second printed circuit board).

According to an embodiment, at least a part of the wiring member 530 and the hinge structure 501 may be disposed in the bracket assembly 50. The wiring member 530 may be disposed in the direction crossing the first bracket 510 and the second bracket 520 (e.g., in the x-axis direction). The wiring member 530 may be disposed in the direction (e.g., the x-axis direction) perpendicular to the folding axis (e.g., the y-axis or the folding axis A in FIG. 3) of the folding area 403 of the display 400.

According to an embodiment, the substrate 550 may include a first substrate 551 disposed on the side of the first bracket 510 and a second substrate 552 disposed on the side of the second bracket 520. The first substrate 551 and the second substrate 552 may be disposed in the space formed by the bracket assembly 50, the first housing structure 310, the second housing structure 320, the first rear cover 380, and the second rear cover 390. Components for executing various functions of the electronic device 30 may be mounted on the first substrate 551 and the second substrate 552.

According to an embodiment, the first housing structure 310 and the second housing structure 320 may be assembled with each other so as to be coupled to both sides of the bracket assembly 50 in the state in which the display unit 40 is coupled to the bracket assembly 50. According to various embodiments, the first housing structure 310 and the second housing structure 320 may slide on both sides of the bracket assembly 50 to then be coupled to the bracket assembly 50.

In an embodiment, the first housing structure 310 may include a first rotation support surface 312, and the second housing structure 320 may include a second rotation support surface 322 corresponding to the first rotation support surface 312. The first rotation support surface 312 and the second rotation support surface 322 may have curved surfaces corresponding to the curved surfaces provided in the hinge cover 330.

In an embodiment, when the electronic device 30 is in the unfolded state (see FIG. 3), the first rotation support surface 312 and the second rotation support surface 322 may cover the hinge cover 330 so as to prevent or minimize the exposure of the hinge cover 330 to the rear surface of the electronic device 30. When the electronic device 30 is in the folded state (see FIG. 4), the first rotation support surface 312 and the second rotation support surface 322 may rotate along the curved surfaces provided in the hinge cover 330, thereby maximizing the exposure of the hinge cover 330 to the rear surface of the electronic device 30.

Figure 6:
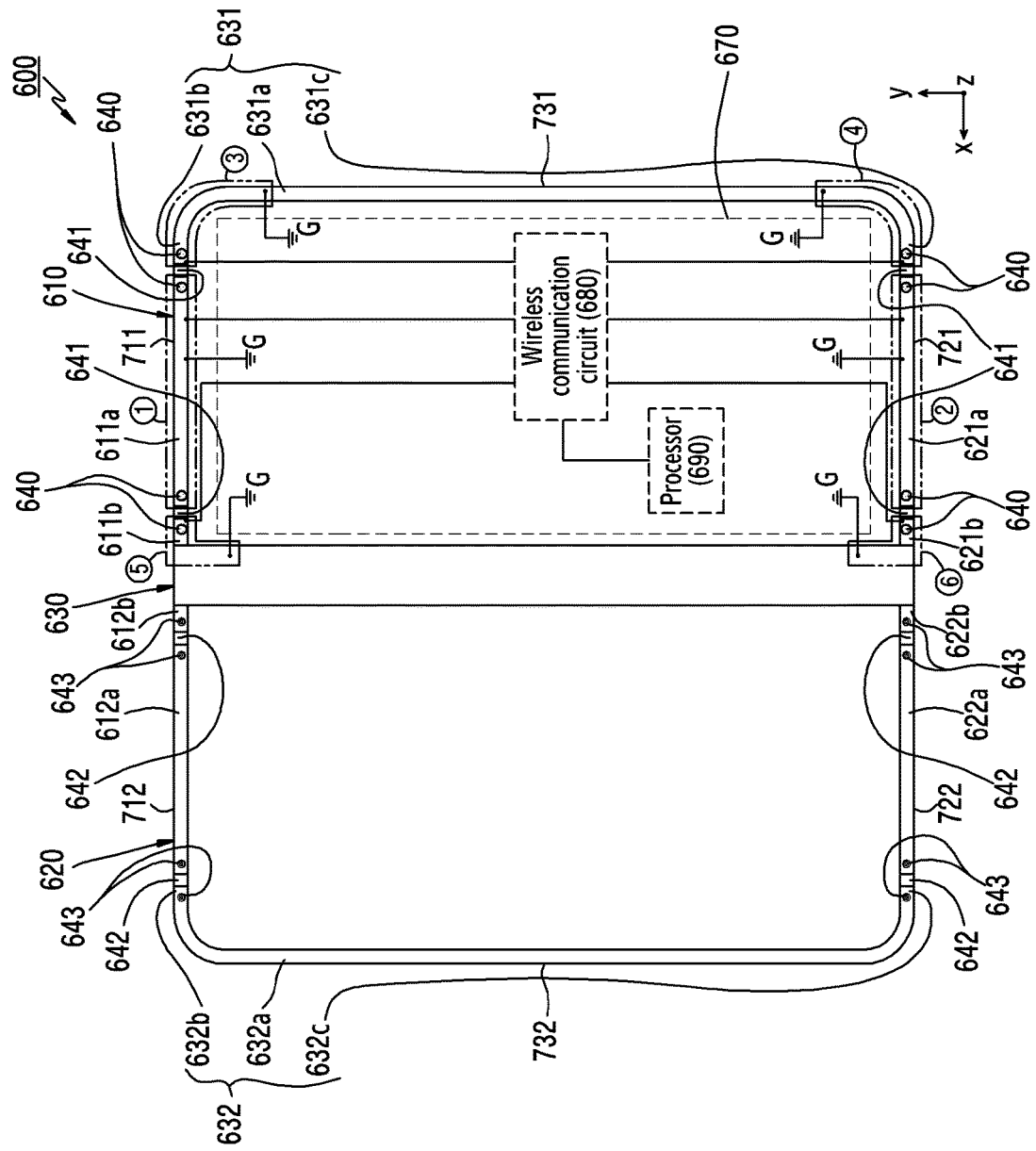
FIG. 6 illustrates an electronic device that uses a side member as an antenna radiator according to an embodiment.
Figure 7:
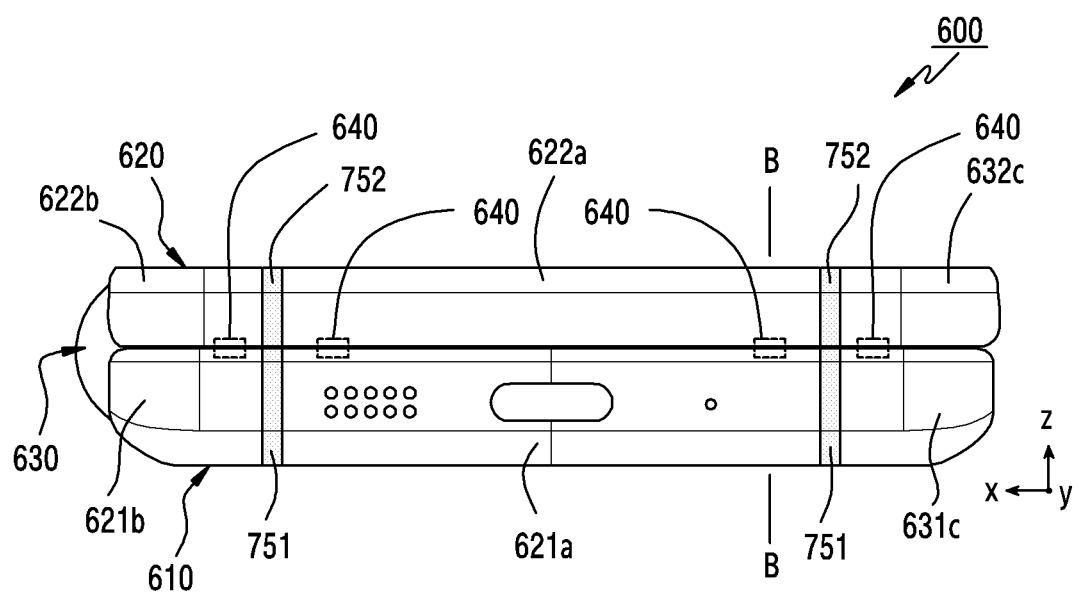
FIG. 7 illustrates a folded state of an electronic device according to an embodiment.

FIG. 6 illustrates an electronic device that uses a side member as an antenna according to an embodiment. FIG. 7 illustrates a folded state of an electronic device according to an embodiment.

Referring to FIG. 6, in an embodiment, an electronic device 600 (e.g., the electronic device 102 in FIG. 1 or the electronic device 30 in FIG. 3) may include at least one of a first side member 610 (e.g., the first side member 311 in FIG. 3), a second side member 620 (e.g., the second side member 321 in FIG. 3), a hinge structure 630 (e.g., the hinge structure 501 in FIG. 5 or the hinge cover 330 in FIG. 3), a wireless communication circuit 680 (e.g., the wireless communication module 192 in FIG. 1), or a processor 690 (e.g., the processor 120 in FIG. 1).

According to an embodiment, the electronic device 600 may include first side surfaces 711 and 712 facing in a first direction, second side surfaces 721 and 722 facing in a second direction opposite the first direction, and third side surfaces 731 and 732 facing in a third direction perpendicular to the first direction.

The first side surfaces 711 and 712 may include, for example, a first side surface 711 formed by the first side member 610 and a first side surface 712 formed by the second side member 620. When the electronic device 600 is in an unfolded state or a folded state (not shown), both the first side surface 711 and the first side surface 712 may form one side surface of the electronic device 600. The second side surfaces 721 and 722 may include, for example, a second side surface 721 formed by the first side member 610 and a second side surface 722 formed by the second side member 620. When the electronic device 600 is in an unfolded state or a folded state (not shown), both the second side surface 721 and the second side surface 722 may form the opposite side surface of the electronic device 600.

The third side surfaces 731 and 732 may include, for example, a third side surface 731 formed by the first side member 610 and a third side surface 732 formed by the second side member 620. As shown in the drawing, when the electronic device 600 is in the unfolded state, the third side surfaces 731 and 732 may be disposed to face in opposite directions to each other. When the electronic device 600 is in the folded state (not shown), both the third side surface 731 and the third side surface 732 may form one side surface of the electronic device 600.

The first side member 610 may include, for example, a plurality of first conductive parts 611a, 611b, 621a, 621b, and 631 that are physically or electrically separated from each other. According to an embodiment, two first conductive parts 611a and 611b may form a portion of the first side surface 711. Other two first conductive parts 621a and 621b may form a portion of the second side surface 721. Another first conductive part 631 may include a part 631a forming the third side surface 731, a part 631b forming a portion of the first side surface 711, and a part 631c forming a portion of the first side surface 712. In an embodiment, referring to FIGS. 6 and 7, there may be gaps (or slits) 641 between a plurality of first conductive parts 611a, 611b, 621a, 621b, and 631, and the gaps 641 may be provided with non-conductive members 751 (e.g., the non-conductive members 371 in FIG. 3) so as to form the first side surface 711 and the second side surface 721 together with the first side member 610.

The second side member 620 may include, for example, a plurality of second conductive parts 612a, 612b, 622a, 622b, and 632 that are physically or electrically separated from each other. According to an embodiment, two second conductive parts 612a and 612b may form a portion of the first side surface 712. Other two second conductive parts 622a and 622b may form a portion of the second side surface 722. Another second conductive part 632 may include a part 632a forming the third side surface 732, a part 632b forming a portion of the first side surface 712, and a part 632c forming a portion of the first side surface 712. According to an embodiment, referring to FIGS. 6 and 7, there may be gaps (or slits) 642 between a plurality of second conductive parts 612a, 612b, 622a, 622b, and 632, and the gaps 642 may be provided with non-conductive members 752 (e.g., the non-conductive members 372 in FIG. 3) so as to form the first side surface 712 and the second side surface 722 together with the second side member 620.

According to an embodiment, at least one of the plurality of first conductive parts 611a, 611b, 621a, 621b, and 631 of the first side member 610 may be electrically connected to a wireless communication circuit 680 (e.g., a radio frequency integrated circuit (RFIC) or an intermediate frequency integrated circuit (IFIC)), and may be used as an antenna (or an antenna radiator). The first conductive part used as an antenna may be defined as a converter that transmits electromagnetic waves from a transmission line to a free space or from a free space to a transmission line, and may be designed so as to transmit or receive electromagnetic energy in the direction and polarization suitable for the purpose. The radiation characteristics and impedance of the first conductive part used as an antenna are related to the antenna radiation performance, and may vary depending on the shape, size, and material thereof. The radiation characteristics of the first conductive part may include an antenna radiation pattern (or antenna pattern), which is a directional function representing the relative distribution of the power radiated from the first conductive part, and the polarization state of the radio wave radiated from the first conductive part (or antenna polarization). The impedance of the first conductive part may be related to the transfer of power from a transmitter to the first conductive part or the transfer of power from the first conductive part to a receiver. In order to minimize reflection at the connection between the transmission line and the first conductive part, the impedance of the first conductive part may be designed to match the impedance of the transmission line, which enables maximum power transfer (or minimum power loss) or efficient signal transmission through the first conductive part. The impedance matching may lead to efficient signal flow at a specific frequency. The transmission line is, for example, a structure for transmitting radio frequency (RF) signals (voltage and current), and may be defined as a conductive system using transmission of waves by electrical parameters (resistance per unit length, inductance, conductance, and capacitance).

For example, the first conductive part 611a, forming a portion of the first side surface 711, may operate as a first antenna ①. The first antenna ① may be electrically connected to the wireless communication circuit 680 at at least one feeding point (not shown), and may be electrically connected to the ground G at at least one grounding point (not shown). The wireless communication circuit 680 may provide current to the first antenna ①, and the current may be transmitted (or circulated) along the first antenna ①, and may flow into the ground G, thereby forming a first transmission line for transmitting or receiving wireless electromagnetic waves. According to an embodiment, the ground G may be disposed on a printed circuit board 670 (e.g., the first substrate 551 in FIG. 5) to which the wireless communication circuit 680 and/or the processor 690 are mounted.

For example, the first conductive part 621a, forming a portion of the second side surface 721, may operate as a second antenna ②. The second antenna ② may be electrically connected to the wireless communication circuit 680 at at least one feeding point (not shown), and may be electrically connected to the ground G at at least one grounding point (not shown). The wireless communication circuit 680 may provide current to the second antenna ②, and the current may be transmitted (or circulated) along the second antenna ②, and may flow into the ground G, thereby forming a second transmission line for transmitting or receiving wireless electromagnetic waves.

For example, a portion of the first conductive part 631, forming a portion of the third side surface 731 and a portion of the first side surface 711, which are disposed on both sides of the corner between the first side surface 711 and the third side surface 731, may operate as a third antenna ③. The third antenna ③ may be electrically connected to the wireless communication circuit 680 at at least one feeding point (not shown), and may be electrically connected to the ground G at at least one grounding point (not shown). The wireless communication circuit 680 may provide current to the third antenna ③, and the current may be transmitted (or circulated) along the third antenna ③, and may flow into the ground G, thereby forming a third transmission line for transmitting or receiving wireless electromagnetic waves.

For example, a portion of the first conductive part 631, forming a portion of the third side surface 731 and a portion of the second side surface 721, which are disposed on both sides of the corner between the second side surface 721 and the third side surface 731, may operate as a fourth antenna ④. The fourth antenna ④ may be electrically connected to the wireless communication circuit 680 at at least one feeding point (not shown), and may be electrically connected to the ground G at at least one grounding point (not shown). The wireless communication circuit 680 may provide current to the fourth antenna ④, and the current may be transmitted (or circulated) along the fourth antenna ④, and may flow into the ground G, thereby forming a fourth transmission line for transmitting or receiving wireless electromagnetic waves.

For example, the first conductive part 611b, which forms a portion of the first side surface 711 and is adjacent to the hinge structure 630, and the conductive portion included in the hinge structure 630, which is electrically connected to the first conductive part 611b, may operate as a fifth antenna ⑤. The first conductive part 611b may be electrically connected to the wireless communication circuit 680 at at least one feeding point (not shown). The conductive portion included in the hinge structure 630 may be electrically connected to the ground G at at least one grounding point (not shown). The wireless communication circuit 680 may provide current to the fifth antenna ⑤, and the current may be transmitted (or circulated) along the fifth antenna ⑤, and may flow into the ground G, thereby forming a fifth transmission line for transmitting or receiving wireless electromagnetic waves.

For example, the first conductive part 621b, which forms a portion of the second side surface 721 and is adjacent to the hinge structure 630, and the conductive portion included in the hinge structure 630, which is electrically connected to the first conductive part 621b, may operate as a sixth antenna ⑥. The first conductive part 621b may be electrically connected to the wireless communication circuit 680 at at least one feeding point (not shown). The conductive portion included in the hinge structure 630 may be electrically connected to the ground G at at least one grounding point (not shown). The wireless communication circuit 680 may provide current to the sixth antenna ⑥, and the current may be transmitted (or circulated) along the sixth antenna ⑥, and may flow into the ground G, thereby forming a sixth transmission line for transmitting or receiving wireless electromagnetic waves.

According to an embodiment, the wireless communication circuit 680 may process a transmission signal or a reception signal in at least one specified frequency band by utilizing at least one of the first antenna ①, the second antenna ②, the third antenna ③, the fourth antenna ④, the fifth antenna ⑤, or the sixth antenna ⑥. For example, the specified frequency band may include at least one of a low band (LB) (about 600 MHz to 1 GHz), a middle band (MB) (about 1 to 2.2 GHz), a high band (HB) (about 2.2 to 2.7 GHz), or an ultra-high band (UHB) (about 2.7 to 3.6 GHz). At least one of the first transmission line, the second transmission line, the third transmission line, the fourth transmission line, the fifth transmission line, or the sixth transmission line may be designed to support various communication services such as a global system for mobile communication (GSM), long-term evolution (LTE), a $5^{th}$ generation (5G) network, and the like by utilizing the frequent band. In addition thereto, various other transmission lines using a frequency adjustment module depending on a communication mode may be formed. For example, various transmission lines may be formed depending on the positions or number of the gaps 641, the positions or number of the feeding points and/or grounding points of each antenna, or the like.

According to various embodiments, the processor 690 may control the wireless communication circuit 680 so as to selectively use at least one of the first transmission line, the second transmission line, the third transmission line, the fourth transmission line, the fifth transmission line, or the sixth transmission line depending on the state of the electronic device 600 (e.g., an unfolded state or a folded state) in a corresponding communication mode. For example, the electronic device 600 may further include a switch or switch circuit configured to selectively connect at least one of the first antenna ①, the second antenna ②, the third antenna ③, the fourth antenna ④, the fifth antenna ⑤, or the sixth antenna ⑥ to the wireless communication circuit 680 under the control of the processor 690 depending on the state of the electronic device 600 (e.g., an unfolded state or a folded state) in a corresponding communication mode.

According to various embodiments, the electronic device 600 may further include a frequency adjustment circuit (or a frequency adjustment module) that is connected to the transmission line between the antenna (e.g., the first antenna ①, the second antenna ②, the third antenna ③), the fourth antenna ④, the fifth antenna ⑤, or the sixth antenna ⑥ and the wireless communication circuit 680, and is capable of moving the resonance frequency of the antenna to a specified frequency or moving the resonance frequency of the antenna by a specified amount under the control of the wireless communication circuit 680 or the processor 690 in order to support a corresponding communication mode. According to various embodiments, the wireless communication circuit 680 may include the frequency adjustment circuit.

Referring to FIGS. 6 and 7, in a folded state, the second side member 620 and the first side member 610 may form an angle of about 0 degrees to 10 degrees, or may be spaced about 0 mm to 5 mm apart from each other. In the folded state, wireless communication, utilizing at least one first conductive part 611a, 611b, 621a, 621b, or 631 as an antenna, may be electrically affected by the second side member 620. For example, in the folded state, the second side member 620 may deteriorate the performance of wireless communication (e.g., antenna radiation performance) using at least one first conductive part. For example, electromagnetic wave energy (or electromagnetic field) emitted from at least one first conductive part may be disturbed by the second side member 620. According to an embodiment, in order to reduce the above electrical influence, the gaps 641 between the plurality of first conductive parts 611a, 611b, 621a, 621b, and 631 of the first side member 610 and the gaps 642 between the plurality of second conductive parts 612a, 612b, 622a, 622b, and 632 of the second side member 620 may be designed to be aligned with each other in the folded state, thereby improving the antenna radiation performance.

Referring to FIGS. 6 and 7, although the alignment of the gaps 641 between the plurality of first conductive parts 611a, 611b, 621a, 621b, and 631 of the first side member 610 and the gaps 642 between the plurality of second conductive parts 612a, 612b, 622a, 622b, and 632 of the second side member 620 in the folded state is able to improve the antenna radiation performance, it may be difficult to obtain antenna radiation performance of a configured value or more due to the electromagnetic coupling between the first conductive part and the second conductive part adjacent to each other. For example, capacitance may be generated between the second conductive part and the first conductive part by electromagnetic coupling in the folded state, and thus the electromagnetic wave energy (or electromagnetic field) emitted from the first conductive part may be induced to the second conductive part. Unlike the forward current flowing through the first conductive part, a reverse current may be generated in the second conductive part by the induced electromagnetic wave energy, which may deteriorate the antenna radiation performance in wireless communication using at least one first conductive part as an antenna. According to an embodiment, the electronic device 600 may include one or more conductive members 640 that electrically connect at least one first conductive part electrically connected to the wireless communication circuit 680 with at least one second conductive part aligned therewith in the folded state.

According to an embodiment, one or more conductive members 640 may be disposed at least in a portion between the first side member 610 and the second side member 620 in the folded state. For example, one or more conductive members 640 may be disposed in the first side member 610, and may come into contact with the second side member 620 while facing the same when the unfolded state switches to the folded state. If the first conductive part electrically connected to the wireless communication circuit 680 is electrically connected to the second conductive part aligned therewith through one or more conductive members 640, like the first conductive part, a forward current may flow through the second conductive part. As a result, the electromagnetic coupling between the first conductive part and the second conductive part may be reduced, thereby obtaining configured antenna radiation performance. According to an embodiment, in the folded state, current may flow from the first conductive part to the second conductive part through at least one conductive member 640, and the second conductive part may operate as an antenna together with the first conductive part.

According to an embodiment, the second side member 620 may include one or more contact areas 643 in contact with one or more conductive members 640 in the folded state. The one or more contact areas 643 may include uncoated areas from which a portion of a coating layer is removed or in which a coating layer is not formed, and the uncoated areas may come into contact with one or more conductive members 640 to then be electrically connected thereto in the folded state.

According to an embodiment, the structure in which the gaps 641 between the plurality of first conductive parts 611a, 611b, 621a, 621b, and 631 of the first side member 610 and the gaps 642 between the plurality of second conductive parts 612a, 612b, 622a, 622b, and 632 of the second side member 620 are aligned with each other in the folded state, and the structure in which the first conductive part and the second conductive part, which are adjacent to each other, are electrically connected by one or more conductive members 640 in the folded state may secure antenna radiation performance, which is substantially similar to that in the unfolded state or is within a configured threshold range.

According to an embodiment, one or more conductive members 640 may have flexibility or elasticity, or may be supported by a separately provided flexible member. For example, one or more conductive members 640 may be elastically disposed between the first side member 610 and the second side member 620 in the folded state.

According to an embodiment, when the electronic device 600 is in the unfolded state, at least one of the plurality of second conductive parts 612a, 612b, 622a, 622b, and 632 of the second side member 620 may be in an electrical floating state.

Figure 8A:
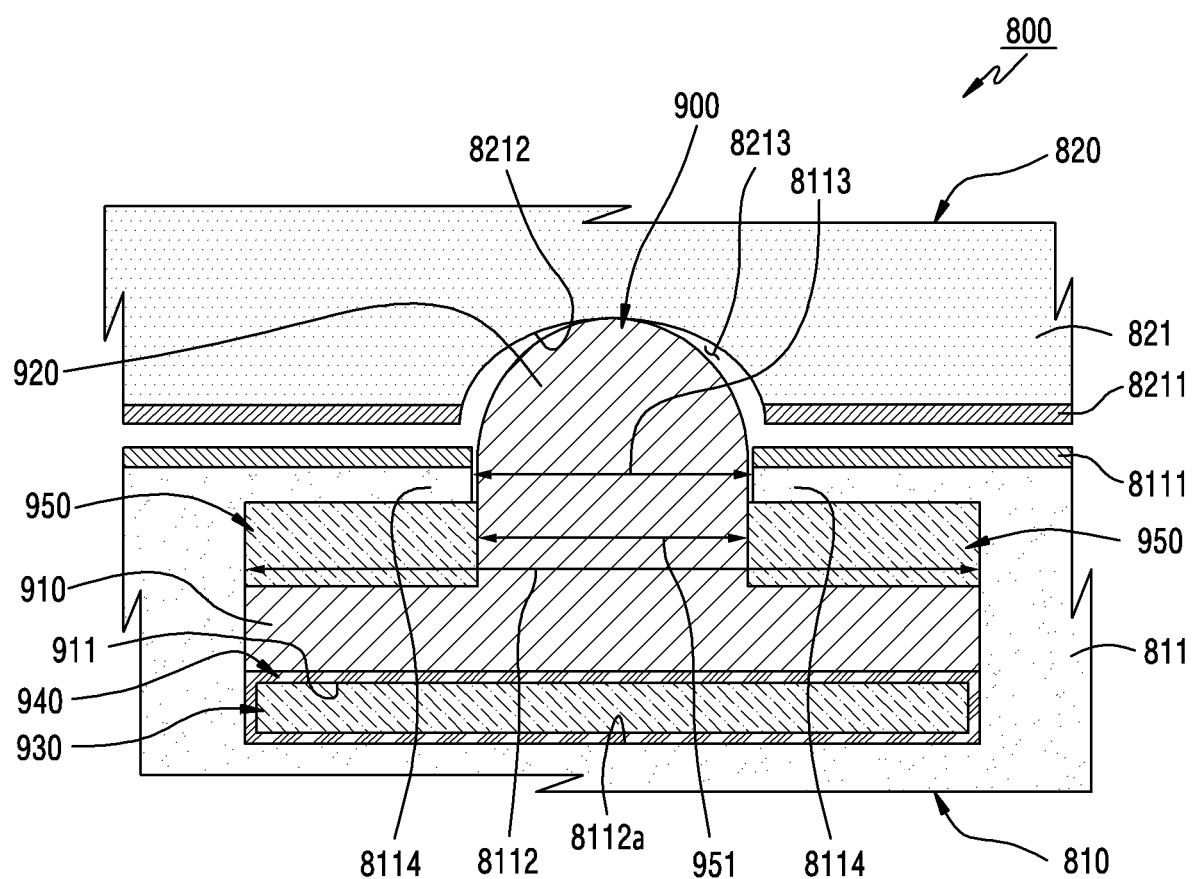
FIG. 8A is a cross-sectional view of the portion BB of the electronic device in a folded state thereof in FIG. 7 according to an embodiment.
Figure 8B:
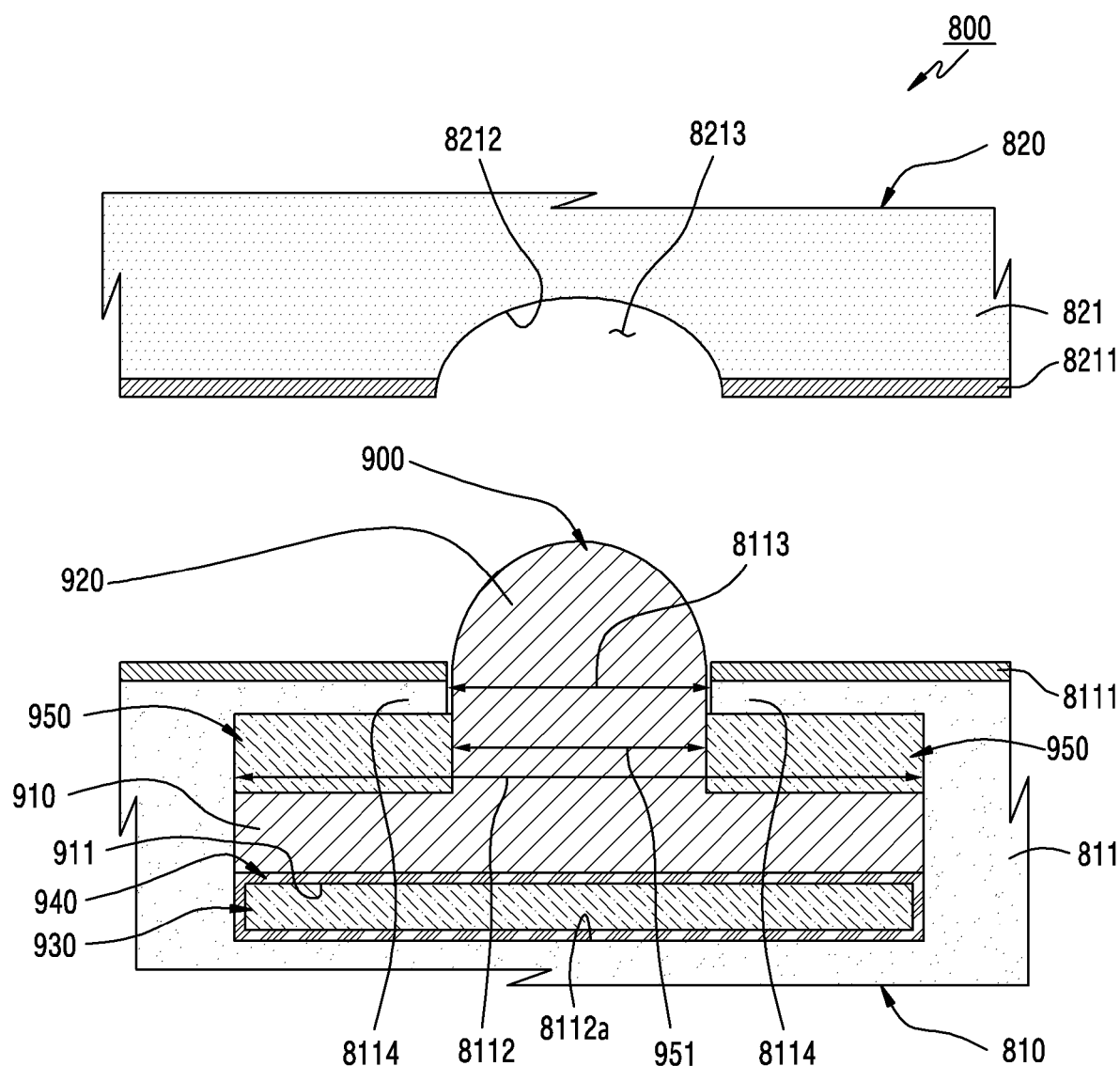
FIG. 8B is a cross-sectional view of an electronic device in an unfolded state according to an embodiment.
Figure 9A:
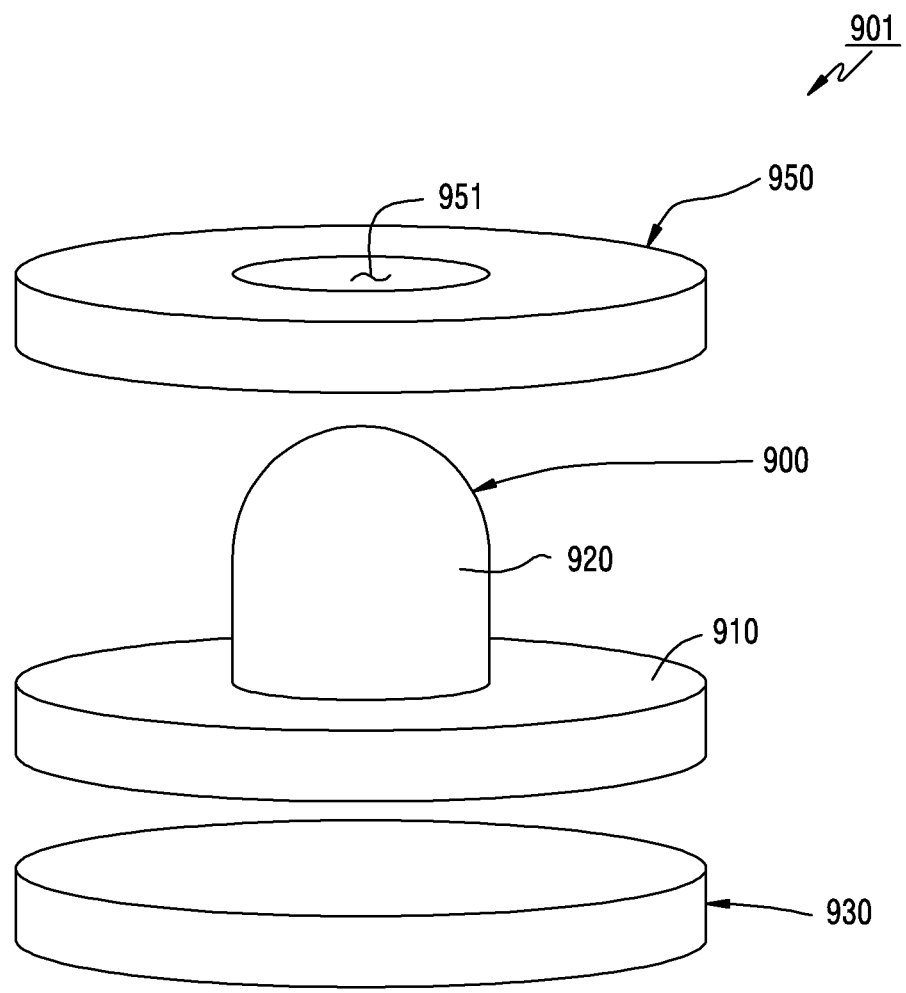
FIG. 9A is a perspective view of a structure including a conductive member according to an embodiment.
Figure 9B:
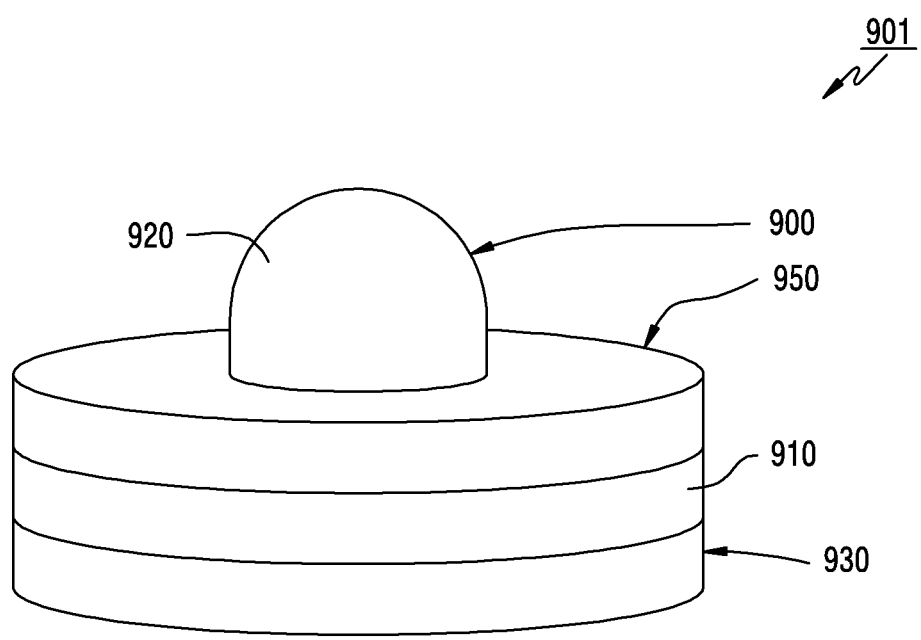
FIG. 9B is an exploded perspective view of the structure shown in FIG. 9A according to an embodiment.

FIG. 8A is a cross-sectional view illustrating the portion BB shown in FIG. 7 in a folded state according to an embodiment. FIG. 8B is a cross-sectional view of an electronic device in an unfolded state according to an embodiment. FIG. 9A is a perspective view of a structure 901 including a conductive member according to an embodiment. FIG. 9B is an exploded perspective view of the structure 901 shown in FIG. 9A according to an embodiment.

Referring to FIGS. 8A and 8B, in an embodiment, an electronic device 800 (e.g., the electronic device 30 in FIG. 3) may include at least one of a first side member 810 (e.g., the first side member 610 in FIG. 6), a second side member 820 (e.g., the second side member 620 in FIG. 6), or a conductive member 900.

According to an embodiment, the second side member 820 may include a partial area 821 (hereinafter, a second area) that extends to face the first side member 810 in the folded state (see FIG. 8A).

According to an embodiment, the first side member 810 may include a partial area 811 (hereinafter, a first area) that extends to face the second area 821 of the second side member 820 in the folded state (see FIG. 8A). At least a portion of the first side member 810 may be electrically connected to a wireless communication circuit (e.g., the wireless communication circuit 680 in FIG. 6).

According to an embodiment, the conductive member 900 may electrically connect the first area 811 of the first side member 810 with the second area 821 of the second side member 820 in the folded state (see FIG. 8A). If the first area 811 and the second area 821 are electrically connected through the conductive member 900, at least a portion of the first side member 810 and at least a portion of the second side member 820 aligned therewith may be electrically connected. Accordingly, in wireless communication using at least a part of the first side member 810, the electrical influence of the second side member 820 may be reduced in the folded state, thereby obtaining configured antenna radiation performance.

Referring to FIGS. 8A, 9A, and 9B, in an embodiment, the conductive member 900 may be disposed in the first area 811 of the first side member 810. The conductive member 900 may come into contact with the second area 821 of the second side member 820 while facing the same in the folded state. According to an embodiment, the conductive member 900 may include a first portion 910 in the shape of a plate and a second portion 920 extending to protrude from the first portion 910. According to an embodiment, the first area 811 may include recesses 8112 and 8113 to which the conductive member 900 is coupled. The recesses 8112 and 8113 may include a first space 8112 having a first width and a second space 8113 having a second width smaller than the first width. The first portion 910 of the conductive member 900 may be disposed in the first space 8112, and the second portion 920 of the conductive member 900 may pass through the second space 8113. The first area 811 may include a step 8114 formed due to a difference in width between the first space 8112 and the second space 8113, and the step 8114 may make it difficult for the first portion 910 of the conductive member 900 to move out of the first space 8112. In the folded state, the second portion 920 of the conductive member 900 may come into contact with one surface (not shown) of the second area 821 of the second side member 820 while facing the same.

Referring to FIG. 8B, in the unfolded state, the second portion 920 of the conductive member 900 may be separated from one surface of the second area 821 of the second side member 820. The first area 811 and the second area 821 may be electrically separated from each other in the unfolded state.

According to an embodiment, the second side member 820 may include a coating layer 8211, and the coating layer 8211 may have corrosion resistance, scratch resistance, stain resistance, and the like, thereby protecting the second side member 820. According to various embodiments, the coating layer 8211 may have a color. According to an embodiment, the coating layer 8211 may be formed by a surface treatment method of electrolytically etching (or performing anodic oxidation on or anodizing) the second side member 820 using a surface treatment liquid. The coating layer 8211 may be formed in various other ways as well. The first side member 810 may also include a coating layer 8111 in a form at least similar to or the same as the coating layer 8211.

The coating layers 8111 and 8211 may have, for example, insulating properties. According to an embodiment, the second area 821 of the second side member 820 may include an uncoated area 8212 from which a portion of the coating layer 8211 is removed or in which a coating layer is not formed (e.g., the contact areas 643 in FIG. 6), and the uncoated area 8212 may come into contact with the second portion 920 of the conductive member 900 to be electrically connected thereto in the folded state. According to an embodiment, the uncoated area 8212 may be formed by the recess 8213 as shown in the drawing. For example, in the folded state, the second portion 920 of the conductive member 900 may be inserted into the recess 8213 to come into contact with the surface of the recess 8213 (the uncoated area 8212). According to an embodiment, the second portion 920 of the conductive member 900 may have an external shape capable of securing a contact area with the uncoated area 8212 of the recess 8213 in the folded state.

According to an embodiment, the electronic device 800 may include a first flexible member (or elastic member) 930 disposed between the first portion 910 of the conductive member 900 and the inner surface 8112a of the first space 8112 facing the rear surface 911 of the first portion 910. In the folded state, the conductive member 900 may be supported by the first flexible member 930 to elastically press the uncoated area 8212 in the folded state. According to various embodiments, the conductive member 900 and the first flexible member 930 elastically supporting the same are able to alleviate the impact on the first side member 810 by the second side member 820 when the unfolded state switches to the folded state.

According to an embodiment, the electronic device 800 may include a conductive adhesion member 940 (e.g., a conductive tape) that electrically connects the conductive member 900 and the first area 811. The conductive adhesion member 940 may be disposed together with the first flexible member 930 between the first portion 910 of the conductive member 900 and the inner surface 8112a of the first space 8112 facing the rear surface 911 of the first portion 910. According to some embodiments, the first flexible member 930 may include a conductive material or a conductive adhesion material, and in this case, the conductive adhesion member 940 may be omitted. According to some embodiments, the conductive member 900 may include a flexible material, and in this case, the first flexible member 930 may be omitted. According to some embodiments, the conductive member 900 may include a flexible material, and the conductive adhesion member 940 may be omitted.

According to an embodiment, the electronic device 800 may further include a second flexible member 950 disposed between the step 8114 and the first portion 910 of the conductive member 900 in the first space 8112. For example, the second flexible member 950 may include a through-hole 951, and the second portion 920 of the conductive member 900 may be inserted into the through-hole 951. The second flexible member 950 may act as a buffer for the conductive member 900 together with the first flexible member 930. According to some embodiments, the second flexible member 950 may be omitted, and in this case, the height of the first portion 910 or first space 8112 may be changed such that the first portion 910 of the conductive member 900 comes into contact with the step 8114.

According to some embodiments (not shown), the conductive member may be disposed in the second area 821 of the second side member 820. In the folded state, the conductive member may come into contact with the first area 811 of the first side member 810 while facing the same.

According to some embodiments (not shown), the electronic device 800 may include a first conductive member disposed in the first area 811 of the first side member 810 and a second conductive member disposed in the second area 821 of the second side member 820. In the folded state, the first conductive member and the second conductive member may come into contact with each other while facing the same.

According to various embodiments, the conductive member and elements related thereto are not limited to the forms shown in FIG. 8A, 8B, 9A, or 9B, and may be formed differently.

Figure 10A:
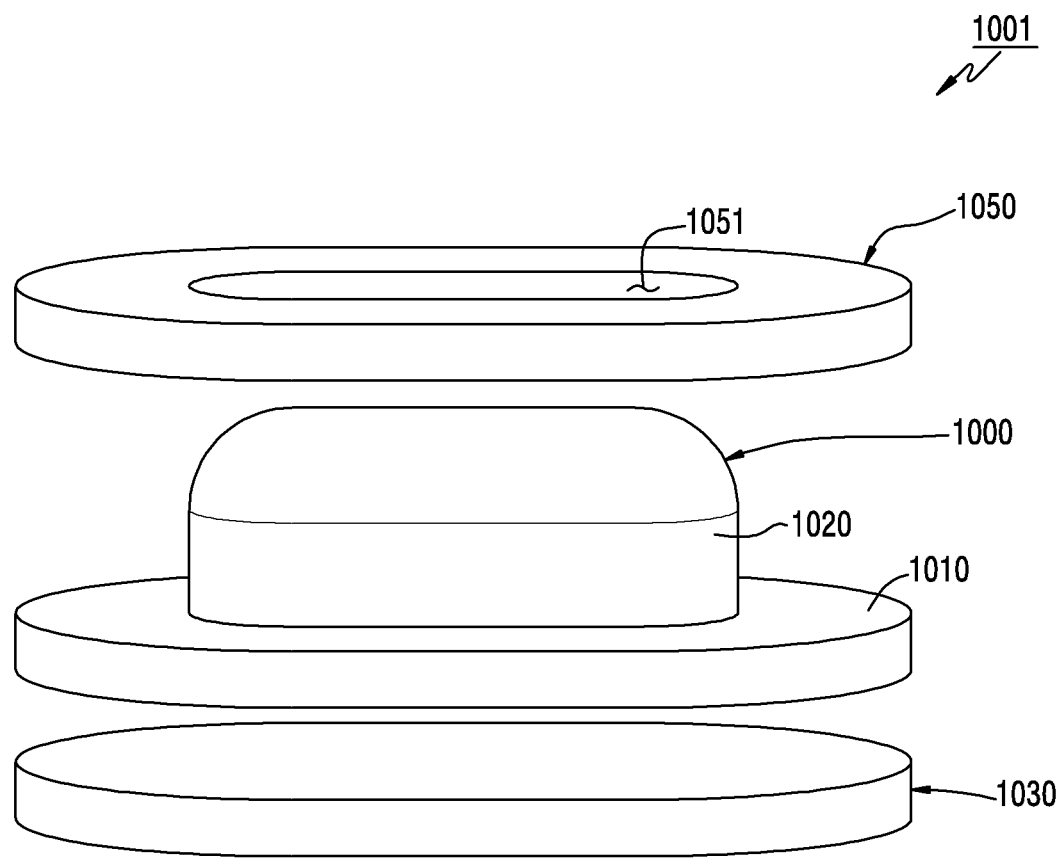
FIG. 10A is a perspective view of a structure including a conductive member according to an embodiment.
Figure 10B:
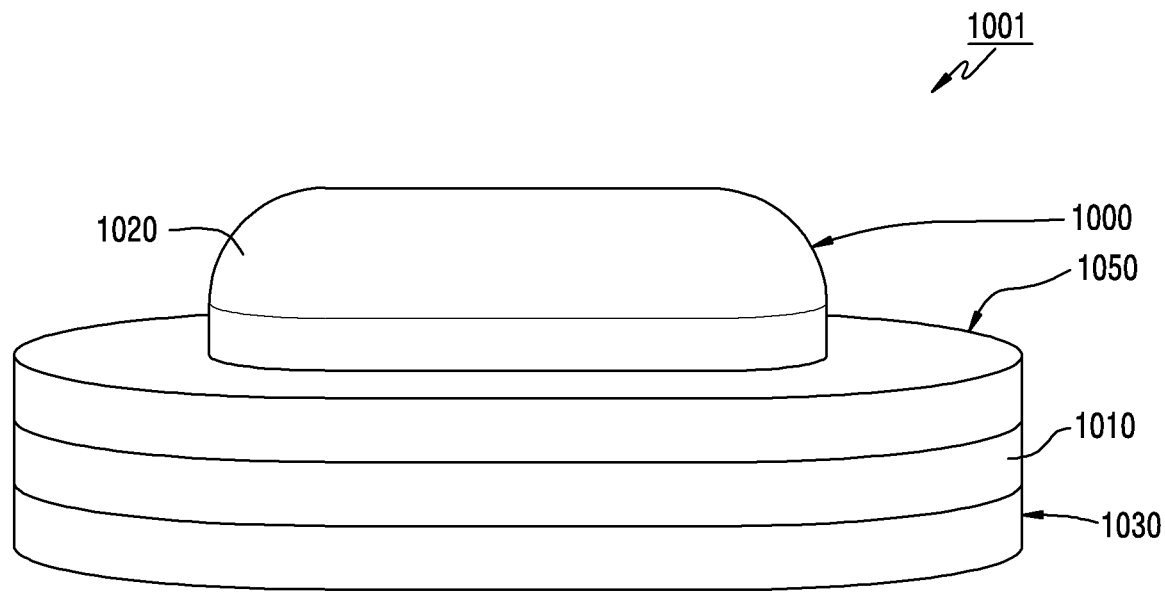
FIG. 10B is an exploded perspective view of the structure shown in FIG. 10A according to an embodiment.

FIG. 10A is a perspective view of a structure 1001 including a conductive member according to an embodiment. FIG. 10B is an exploded perspective view of the structure 1001 shown in FIG. 10A according to an embodiment.

Referring to FIGS. 10A and 10B, in an embodiment, the structure 1001 may include at least one of a conductive member 1000, a first flexible member (or elastic member) 1030, or a second flexible member 1050. The conductive member 1000 may include a first portion 1010 in the form of a plate and a second portion 1020 extending to protrude from the first portion 1010, and is similar to the conductive member 900 in FIG. 9A or 9B, so detailed descriptions thereof will be omitted. Since the first flexible member 1030 is similar to the first flexible member 930 in FIG. 9A or 9B, a detailed description thereof will be omitted. The second flexible member 1050 may include a through-hole 1051 into which the second portion 1020 of the conductive member 1000 is inserted, and is similar to the second flexible member 950 in FIG. 9A or 9B, so a detailed description thereof will be omitted. According to an embodiment, the structure 1001 in FIG. 10A or 10B is able to provide contact with a more extended area in the folded state, compared to the structure 901 in FIG. 9A or 9B.

Figure 11:
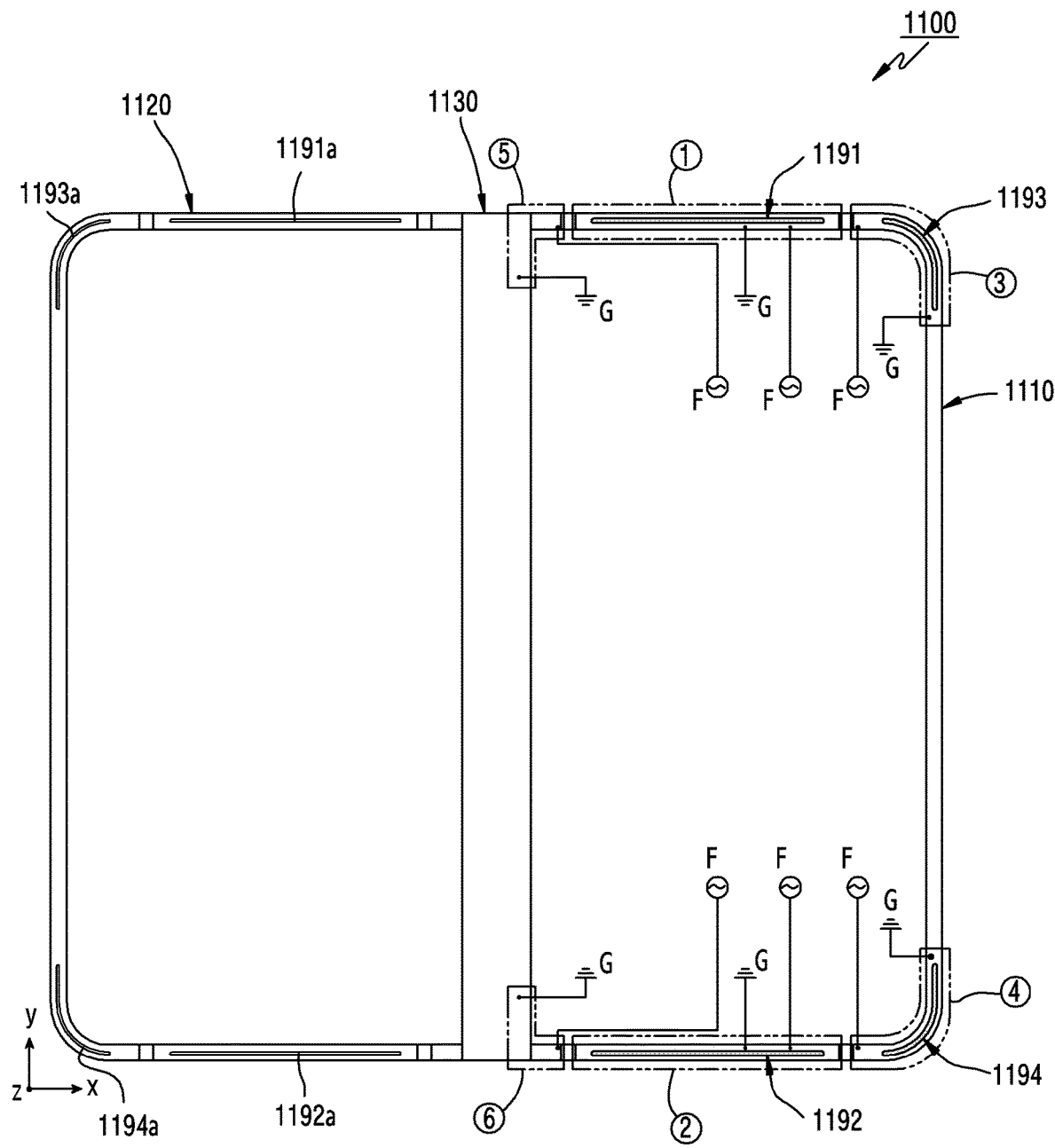
FIG. 11 illustrates an electronic device in an unfolded state according to an embodiment.

FIG. 11 illustrates an electronic device in an unfolded state according to an embodiment.

Referring to FIG. 11, in an embodiment, an electronic device 1100 (e.g., the electronic device 600 in FIG. 6) may include at least one of a first side member 1110 (e.g., the first side member 610 in FIG. 6), a second side member 1120 (e.g., the second side member 620 in FIG. 6), or a hinge structure 1130 (e.g., the hinge structure 630 in FIG. 6). The first side member 1110, the second side member 1120, and the hinge structure 1130 are substantially the same as those in FIG. 6, so detailed descriptions thereof will be omitted.

According to an embodiment, the electronic device 1100 includes at least one of a first antenna ①, a second antenna ②, a third antenna ③, a fourth antenna ④, a fifth antenna ⑤, or a sixth antenna ⑥, which use at least a part of the first side member 1110. The first antenna ①, the second antenna ②, the third antenna ③, the fourth antenna ④, the fifth antenna ⑤, and the sixth antenna ⑥ may be supplied with power F from a wireless communication circuits (e.g., the wireless communication 680 in FIG. 6), and may be electrically connected to the ground G. The first antenna ①, the second antenna ②, the third antenna ③, the fourth antenna ④, the fifth antenna ⑤, and the sixth antenna ⑥ are substantially the same as those in in FIG. 6, so detailed descriptions thereof will be omitted.

According to an embodiment, the electronic device 1100 may include a conductive member that is disposed on the antenna (e.g., the first antenna ①, the second antenna ②, the third antenna ③, the fourth antenna ④, the fifth antenna ⑤, or the sixth antenna ⑥) and at least follows a straight form in which the antenna extends. When the electronic device 1100 is in a folded state (not shown), the conductive member may come into contact with the second side member 1120 while facing the same.

For example, a first conductive member 1191 (e.g., the conductive member 1000 in FIG. 10A or 10B) may be disposed on the first antenna ①, and may at least follow a straight form in which the first antenna ① extends. For example, a second conductive member 1192 may be disposed on the second antenna ②, and may at least follow a straight form in which the second antenna extends. For example, a third conductive member 1193 may be disposed on the third antenna ③, and may at least follow the form of a curved line along which the third antenna ③ extends. For example, a fourth conductive member 1194 may be disposed on the fourth antenna ④, and may at least follow the form of a curved line along which the fourth antenna ④ extends.

According to an embodiment, the second side member 1120 may include contact areas 1191a, 1192a, 1193a, and 1194a that are in contact with the conductive members 1191, 1192, 1193, and 1194 in the folded state. The contact areas 1191a, 1192a, 1193a, and 1194a (e.g., the uncoated area 8212 in FIG. 8A) may include uncoated areas from which a portion of a coating layer is removed or in which a coating layer is not formed, and the uncoated areas may come into contact with the conductive members 1191, 1192, 1193, and 1194, and may be electrically connected thereto in the folded state.

Figure 12:
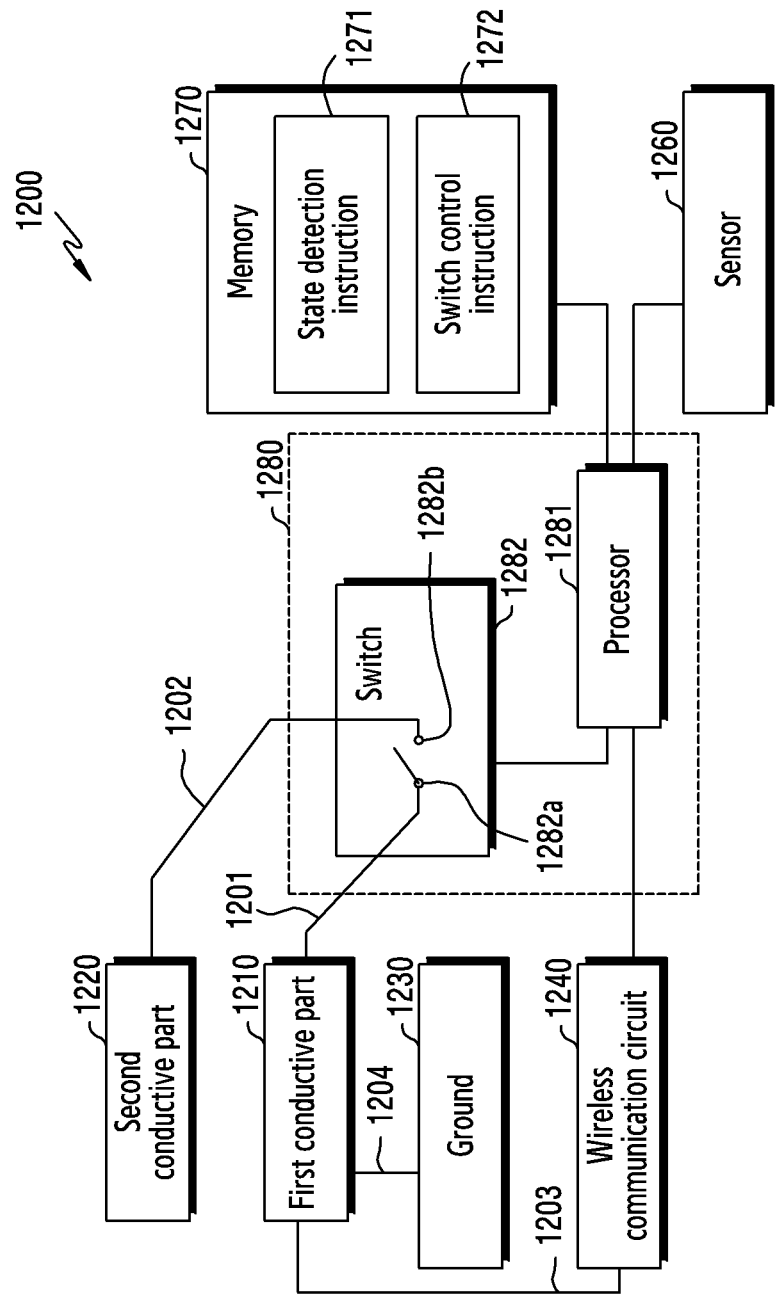
FIG. 12 is a block diagram of an electronic device that uses a side member as an antenna radiator according to an embodiment.

FIG. 12 is a block diagram of an electronic device that utilizes a side member as an antenna radiator according to an embodiment.

Referring to FIG. 12, an electronic device 1200 (e.g., the electronic device 101 in FIG. 1 or the electronic device 30 in FIG. 3) may include at least one of at least one first conductive part 1210, at least one second conductive part 1220, the ground 1230, a wireless communication circuit 1240, at least one sensor 1260, a memory 1270, or a control circuit 1280.

According to an embodiment, the electronic device 1200 may include a first housing structure (e.g., the first housing structure 310 in FIG. 3), a second housing structure (e.g., the second housing structure 320 in FIG. 3), and a hinge structure (e.g., the hinge structure 501 in FIG. 5) connecting the first housing structure and the second housing structure. The first housing structure may include a first surface facing in a first direction, a second surface facing in a second direction opposite the first direction, and a first side member (e.g., the first side member 311 in FIG. 3 or 4) surrounding at least a portion of the space between the first surface and the second surface. The second housing structure may include a third surface facing in a third direction, a fourth surface facing in a fourth direction opposite the third direction, and a second side member (e.g., the second side member 321 in FIG. 3 or 4) surrounding at least a portion of the space between the third surface and the fourth surface, and may be folded against the first housing structure around the hinge structure. The first surface may face the third surface in the folded state, and the third direction may be the same as the first direction in the unfolded state.

According to an embodiment, at least one first conductive part 1210 may be at least one conductive part that forms at least a part of the first side member (e.g., the first side member 311 in FIG. 3) of the first housing structure (e.g., the first housing structure 310 in FIG. 3) or is included therein. At least one first conductive part 1210 may be electrically connected to the wireless communication circuit 1240 through at least one electrical path 1203, and may operate as an antenna.

According to an embodiment, at least one second conductive part 1220 may be at least one conductive part that forms at least a part of the second side member (e.g., the second side member 321 in FIG. 3) of the second housing structure (e.g., the second housing structure 320 in FIG. 3) or is included therein. When the electronic device 1200 is in the folded state (e.g., see FIG. 4), at least one second conductive part 1220 may be aligned with at least one first conductive part 1210.

According to an embodiment, the ground 1230 may include a ground plane accommodated in the first housing structure (e.g., the first housing structure 310 in FIG. 3) (e.g., a ground plane included in the first substrate 551 in FIG. 5). The ground 1230 may be electrically connected to at least one first conductive part 1210 through at least one electrical path 1204. The ground 1230 may serve as an antenna ground for at least one antenna (e.g., at least one first conductive part 1210).

The wireless communication circuit 1240 may establish communication between, for example, the electronic device 1200 and an external electronic device (e.g., the electronic device 102 or 104, or the server 108 in FIG. 1). For example, the wireless communication circuit 1240 may be connected to a network (e.g., the first network 198 or the second network 199 in FIG. 1) through wireless communication, thereby communicating with an external electronic device.

According to an embodiment, the wireless communication circuit 1240 may include at least one of a cellular module, a Wi-Fi module, a Bluetooth module, a GNSS module (e.g., a GPS module, a Glonass module, a Beidou module, or a Galileo module), an NFC module, or a radio frequency (RF) module.

The cellular module may provide, for example, a voice call, a video call, a text message service, or an Internet service through a communication network. According to an embodiment, the cellular module may perform identification and authentication of the electronic device 1200 using a subscriber identification module (e.g., the subscriber identification module 196 in FIG. 1) in the communication network. According to an embodiment, the cellular module may perform at least some of the functions capable of being provided by the processor 1281. According to an embodiment, the cellular module may include a communication processor (CP).

Each of the Wi-Fi module, the Bluetooth module, the GNSS module, and the NFC module may include, for example, a processor for processing data transmitted and received through a corresponding module. According to some embodiments, at least some (e.g., two or more) of the cellular module, the Wi-Fi module, the Bluetooth module, the GNSS module, or the NFC module may be included in one integrated chip (IC) or IC package.

The RF module may transmit and receive, for example, communication signals (e.g., RF signals). The RF module may include, for example, at least one of a transceiver, a power amp module (PAM), a frequency filter, or a low-noise amplifier (LNA). According to another embodiment, at least one of the cellular module, the Wi-Fi module, the Bluetooth module, the GNSS module, or the NFC module may transmit and receive RF signals through separate RF modules.

According to an embodiment, the wireless communication circuit 1240 (e.g., the wireless communication module 192 in FIG. 1) may support various types of communications (e.g., the first network 198 or the second network 199 in FIG. 1) using at least one first conductive part 1210 as an antenna. The wireless communication circuit 1240 may transmit and/or receive a radio frequency signal through at least one first conductive part 1210. The wireless communication circuit 1240 may include various RF components (e.g., a radio frequency integrated circuit (RFIC) and a front end module (FEM)) between the antenna (e.g., at least one first conductive part 1210) and a control circuit 1280.

For example, in receiving a radio signal, a wireless communication circuit 1240 (e.g., a radio frequency integrated circuit (RFIC)) may receive a radio signal from at least one antenna (e.g., at least one first conductive part 1210), may convert the received radio signal into a baseband signal, and may transmit the converted baseband signal to the processor 1281. The processor 1281 may process the received baseband signal, and may control a human/mechanical interface of the electronic device 1200 corresponding to the received baseband signal. For example, in transmitting a radio signal, the processor 1281 may produce a baseband signal, and may output the same to the wireless communication circuit 1240. The wireless communication circuit 1240 may receive the baseband signal from the processor 1281, may convert the received baseband signal into a radio signal, and may transmit the same through at least one antenna (e.g., at least one first conductive part 1210) in the air.

For example, the wireless communication circuit 1240 (e.g., the FEM) may include a transceiver capable of controlling a radio wave signal. The wireless communication circuit 1240 may connect at least one antenna with an RFIC, and may separate transmission/reception signals. For example, the FEM may play a role of filtering and amplifying signals, and may include a front end module at a receiving end, which includes a filter for filtering a reception signal therein, and a front end module at a transmitting end, which includes a power amplifier module (PAM) for amplifying a transmission signal therein.

According to various embodiments, the wireless communication circuit 1240 may support at least one communication scheme of single input multiple output (SIMO), multiple input single output (MISO), diversity, or multiple input multiple output (MIMO) using at least one antenna (e.g., at least one first conductive part 1210).

According to various embodiments, the wireless communication circuit 1240 may process a transmission signal or a reception signal in at least one specified frequency band using at least one antenna (e.g., at least one first conductive part 910). For example, the specified frequency band may include at least one of a low band (LB) (about 600 MHz to 1 GHz), a middle band (MB) (about 1 to 2.2 GHz), a high band (HB) (about 2.2 to 2.7 GHz), or an ultra-high band (UHB) (about 2.7 to 3.6 GHz).

According to an embodiment, the control circuit 1280 may include a processor 1281 and a switch 1282. The processor 1281 may be electrically connected to the wireless communication circuit 1240, the switch 1282, the memory 1270, and/or at least one sensor 1260. The processor 1281 may control the switch 1282 according to instructions stored in the memory 1270.

The memory 1270 may store, for example, instructions that cause the processor 1281 to control the switch 1282. According to an embodiment, the memory 1270 may store at least one of a state detection instruction 1271 and a switch control instruction 1272.

According to an embodiment, the state detection instruction 1271 may include a routine that causes the processor 1281 to detect an unfolded state (see FIG. 3) or a folded state (see FIG. 4) of the electronic device 1200 using at least one sensor 1260.

According to an embodiment, the at least one sensor 1260 may include a proximity sensor (e.g., a proximity sensor disposed in the component mounting area 314 of the first housing structure 310 in FIG. 3). For example, when the electronic device 1200 is in the folded state (see FIG. 4), the proximity sensor disposed in the first housing structure (e.g., the first housing structure 310 in FIG. 4) may output an electrical signal indicating the proximity of the second housing structure (e.g., the second housing structure 320 in FIG. 4).

According to another embodiment, at least one sensor 1260 may include a hall integrated circuit (IC). For example, the first housing structure (e.g., the first housing structure 310 in FIG. 3) may include a Hall IC, and the second housing structure (e.g., the second housing structure 320 in FIG. 3) may include a magnet. When the electronic device 1200 is in the folded state (see FIG. 4), the Hall IC disposed in the first housing structure and the magnet disposed in the second housing structure may be aligned so that the Hall IC may recognize the magnet, thereby outputting an electrical signal.

According to another embodiment, at least one sensor 1260 may include an image sensor (e.g., a front camera disposed in the component mounting area 314 of the first housing structure 310 in FIG. 3). For example, the image sensor disposed in the first housing structure (e.g., the first housing structure 310 in FIG. 4) may obtain image data regarding the second housing structure (e.g., the second housing structure 320 in FIG. 4), and the processor 1281 may determine the unfolded state or the folded state of the electronic device 1200, based on the image data.

According to various embodiments, the unfolded state or the folded state of the electronic device 1200 may be detected using various other sensors.

According to some embodiments, the first housing structure (e.g., the first housing structure 310 in FIG. 3) may include a first contact, and the second housing structure (e.g., the second housing structure 320 in FIG. 3) may include a second contact. When the electronic device 1200 is in the folded state (see FIG. 4), the first contact disposed in the first housing structure and the second contact disposed in the second housing structure may come into physical contact with each other to be electrically connected, and the processor 1281 may also recognize the folded state, based on the electrical connection.

According to an embodiment, the switch control instruction 1272 may include a routine that causes the processor 1281 to control the switch 1282, based on the unfolded state or the folded state of the electronic device 1200. According to an embodiment, based on the folded state or the unfolded state, at least one second conductive part 1220 may be selectively and electrically connected to at least one first conductive part 1210.

According to an embodiment, when the electronic device 1200 is in the folded state (see FIG. 4), the processor 1281 may control the switch 1282 (e.g., a single pole, double throw (SPDT) switch) such that at least one second conductive part 1220 is electrically connected to at least one first conductive part 1210. When the electronic device 1200 is in the folded state, at least one second conductive part 1220 may be aligned with at least one first conductive part 1210 to affect the antenna radiation performance of at least one first conductive part 1210. According to an embodiment, if at least one second conductive part 1220 is electrically connected with at least one first conductive part 1210 in the folded state, electromagnetic coupling between the first conductive part 1210 and the second conductive part 1220 may be reduced, thereby securing configured antenna radiation performance. According to an embodiment, in the folded state, current may flow from the first conductive part 1210 to the second conductive part 1220, and the second conductive part 1220 may act as an antenna together with the first conductive part 1210.

According to an embodiment, when the electronic device 1200 is in the unfolded state (see FIG. 3), the processor 1281 may control the switch 1282 to release the electrical connection between at least one first conductive part 1210 and at least one second conductive part 1220.

According to an embodiment, the switch 1282 may include a terminal 1282a electrically connected to at least one first conductive part 1210 and a terminal 1282b electrically connected to at least one second conductive part 1220. In the folded state of the electronic device 1200, the switch 1282 may electrically connect the terminals 1282a and 1282b under the control of the processor 1281. In the unfolded state of the electronic device 1200, the switch 1282 may release the electrical connection between the terminals 1282a and 1282b under the control of the processor 1281.

According to an embodiment, the electronic device 1200 may include a first electrical path 1201 that electrically connects at least one first conductive part 1210 with a first terminal 1282a of the switch 1282. According to an embodiment, the electronic device 1200 may include a second electrical path 1202 that electrically connects at least one second conductive part 1220 with a second terminal 1282b of the switch 1282.

According to an embodiment, the first electrical path 1201 may include at least one first terminal (not shown) extending from a first position of at least one first conductive part 1210. The second electrical path 1202 may include at least one second terminal (not shown) extending from a second position of at least one second conductive part 1220. For example, the first terminal may extend to protrude from at least one first conductive part 1210 to the inner space of the electronic device 1200, and the second terminal may extend to protrude from at least one second conductive part 1220 to the inner space of the electronic device 1200. According to an embodiment, in the folded state (see FIG. 4), the first position and the second position, or at least one first terminal and at least one second terminal may be aligned with each other. According to various embodiments, the first electrical path 1201 or the second electrical path 1202 may be implemented as various conductive paths such as a conductive pattern provided on an FPC or a PCB, or a cable.

According to an embodiment, the structure for electrically connecting the first conductive part 1210 and the second conductive part 1220 when the folded state of the electronic device 1200 is detected using at least one sensor 1260 is an embodiment replacing the embodiment in FIG. 6 (the structure in which the first conductive part and the second conductive part are electrically connected by the conductive members 640 therebetween in the folded state), thereby securing antenna radiation performance in the folded state.

Figure 13:
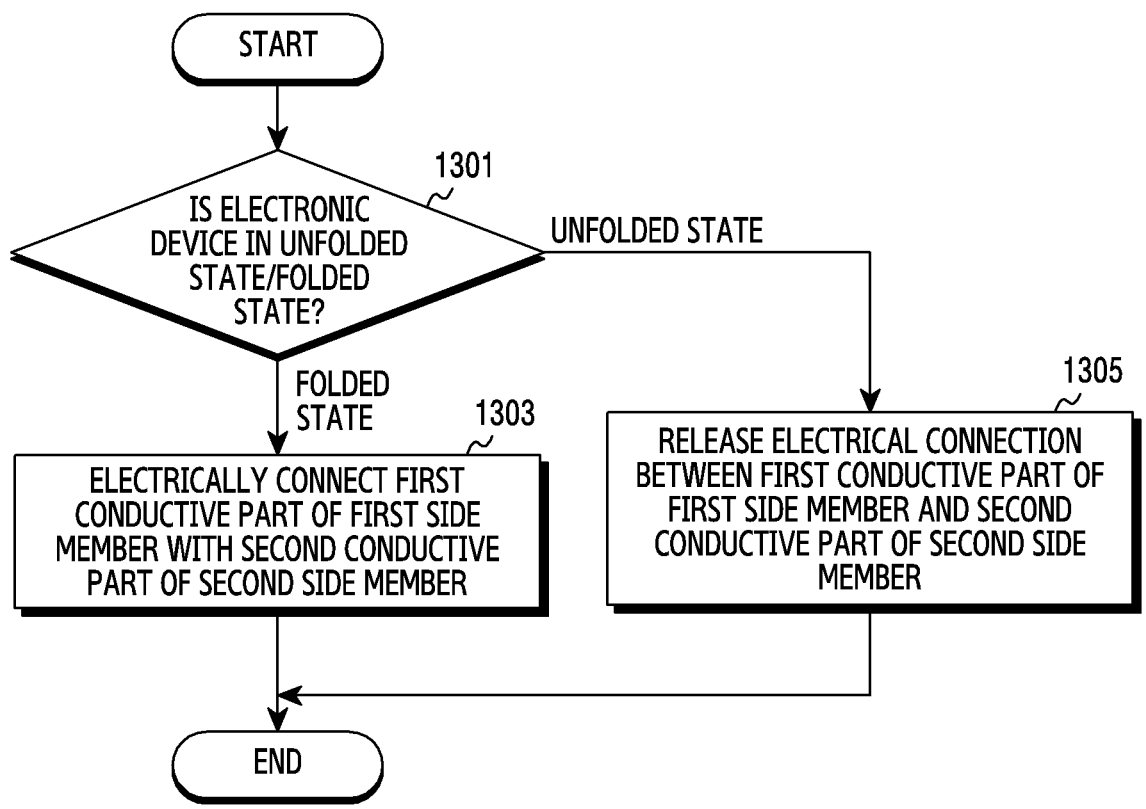
FIG. 13 is a flowchart illustrating the operation of an electronic device according to an embodiment.
Figure 14:
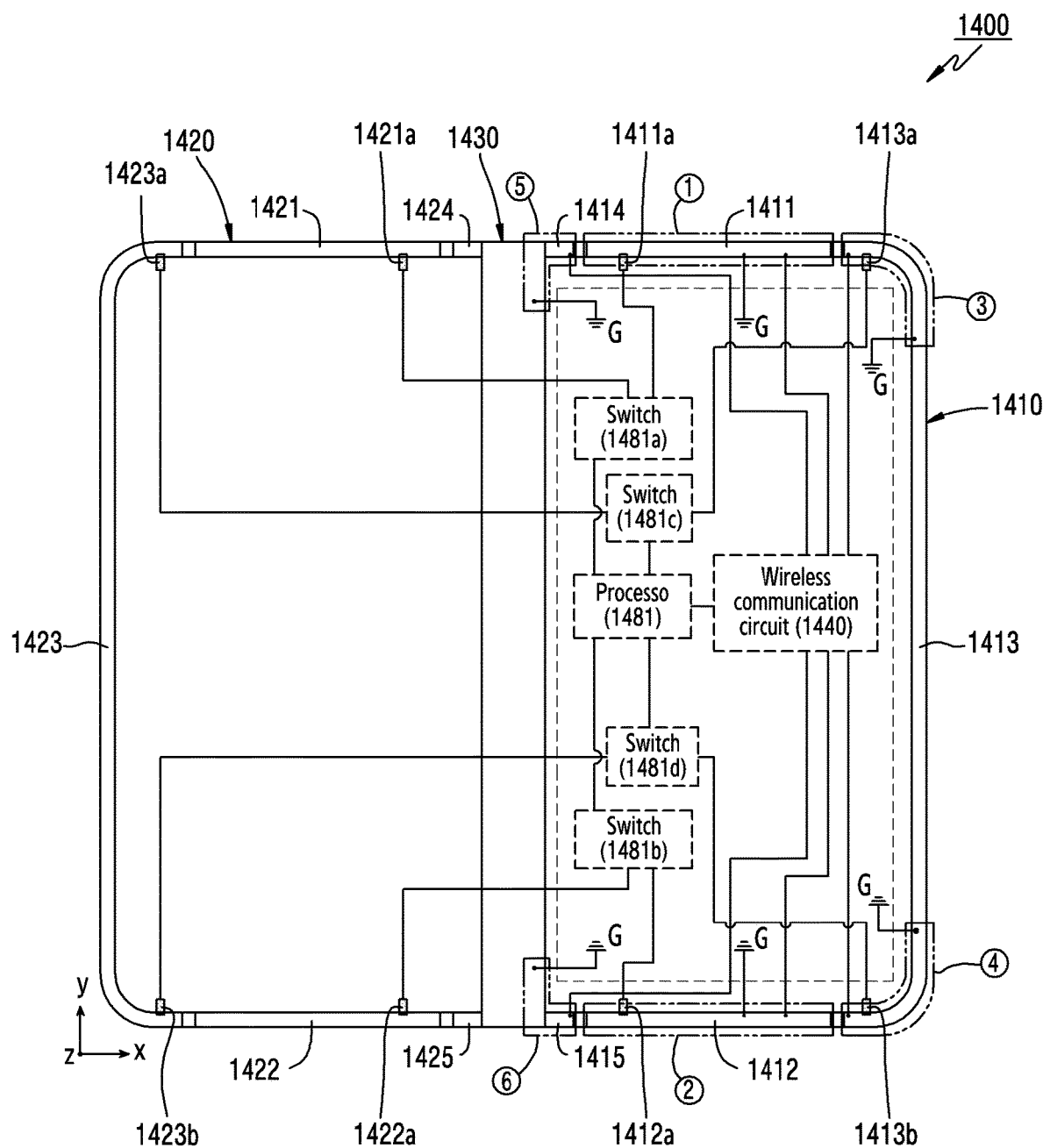
FIG. 14 illustrates an electronic device that uses a side member as an antenna radiator in order to explain the flowchart in FIG. 13 according to an embodiment.

FIG. 13 is a flowchart illustrating the operation of an electronic device according to an embodiment. FIG. 14 illustrates an electronic device that uses a side member as an antenna radiator in order to explain the flowchart in FIG. 13.

Referring to FIG. 13, in operation 1301, a processor (e.g., the processor 1281 in FIG. 12) may determine whether an electronic device is in an unfolded state or a folded state. According to various embodiments, the processor may detect an unfolded state or a folded state of the electronic device using at least one sensor (e.g., the sensor module 176 in FIG. 1 or the at least one sensor 1260 in FIG. 12).

Referring to FIG. 14, in an embodiment, an electronic device 1400 (e.g., the electronic device 30 in FIG. 3) may include at least one of a first side member 1410 (e.g., the first side member 311 in FIG. 3), a second side member 1420 (e.g., the second side member 321 in FIG. 3), or a hinge structure 1430 (e.g., the hinge structure 501 in FIG. 5). Since the first side member 1110, the second side member 1120, and the hinge structure 1130 are substantially the same as those in FIG. 11, detailed descriptions thereof will be omitted.

According to an embodiment, the first side member 1410 may include a plurality of first conductive parts, and the plurality of first conductive parts 1411, 1412, 1413, 1414, and 1415 may be implemented as a first antenna ①, a second antenna ②, a third antenna ③, a fourth antenna ④, a fifth antenna ⑤, or a sixth antenna ⑥ electrically connected to a wireless communication circuit 1440 (e.g., wireless communication circuit 1240 in FIG. 12). The first antenna ①, the second antenna ②, the third antenna ③, the fourth antenna ④, the fifth antenna ⑤, and the sixth antenna ⑥ may be supplied with power from the wireless communication circuit 1440, and may be electrically connected to the ground G (e.g., the ground 1230 in FIG. 12). The first antenna ①, the second antenna ②, the third antenna ③, the fourth antenna ④, the fifth antenna ⑤, and the sixth antenna ⑥ are substantially the same as those in FIG. 11, so detailed descriptions thereof will be omitted.

According to an embodiment, the second side member 1420 may include a plurality of second conductive parts 1421, 1422, 1423, 1424, and 1425. In the folded state (e.g., see FIG. 4), the plurality of second conductive parts 1421, 1422, 1423, 1424, and 1425 may be aligned with a plurality of first conductive parts (1411, 1412, 1413, 1414, and 1415 of the first side member 1410.

Referring to FIGS. 13 and 14, in an embodiment, if it is determined that the electronic device 1400 is in the folded state, in operation 1303, a processor 1481 (e.g., the processor 1281 in FIG. 12) may electrically connect the first conductive part 1411, 1412, 1413, 1414, or 1415 of the first side member 1410 and the second conductive part 1421, 1422, 1423, 1424, or 1425 of the second side member 1420.

For example, the first conductive part 1411 implementing the first antenna ① may include a terminal 1411*a* extending to protrude from the first conductive part 1411. The second conductive part 1421 may include a terminal 1421*a* extending to protrude from the second conductive part 1421. According to an embodiment, in the folded state (see FIG. 4), the terminal 1411*a* of the first conductive part 1411 and the terminal 1421*a* of the second conductive part 1421 may be aligned. In the folded state, a switch 1482*a* (e.g., the switch 1282 in FIG. 12) may electrically connect the terminal 1411*a* of the first conductive part 1411 to the terminal 1421*a* of the second conductive part 1421 under the control of the processor 1481.

For example, the first conductive part 1412 implementing the second antenna ② may include a terminal 1412*a* extending to protrude from the first conductive part 1412. The second conductive part 1422 may include a terminal 1422*a* extending to protrude from the second conductive part 1422. According to an embodiment, in the folded state (see FIG. 4), the terminal 1412*a* of the first conductive part 1412 and the terminal 1422*a* of the second conductive part 1422 may be aligned. In the folded state, a switch 1482*b* (e.g., the switch 1282 in FIG. 12) may electrically connect the terminal 1412*a* of the first conductive part 1412 to the terminal 1422*a* of the second conductive part 1422 under the control of the processor 1481.

For example, a portion of the first conductive part 1413 implementing the third antenna ③ may include a terminal 1413*a* extending to protrude from the first conductive part 1413. The second conductive part 1423 may include a terminal 1423*a* extending to protrude from the second conductive part 1423. According to an embodiment, in the folded state (see FIG. 4), the terminal 1413*a* of the first conductive part 1413 and the terminal 1423*a* of the second conductive part 1423 may be aligned. In the folded state, a switch 1482*c* (e.g., the switch 1282 in FIG. 12) may electrically connect the terminal 1413*a* of the first conductive part 1413 to the terminal 1423*a* of the second conductive part 1423 under the control of the processor 1481.

For example, a portion of the first conductive part 1413 implementing the fourth antenna ④ may include a terminal 1413*b* extending to protrude from the first conductive part 1413. The second conductive part 1423 may include a terminal 1423*b* extending to protrude from the second conductive part 1423. According to an embodiment, in the folded state (see FIG. 4), the terminal 1413*b* of the first conductive part 1413 and the terminal 1423*b* of the second conductive part 1423 may be aligned. In the folded state, a switch 1482*d* (e.g., the switch 1282 in FIG. 12) may electrically connect the terminal 1413*b* of the first conductive part 1413 and the terminal 1423*b* of the second conductive part 1423 under the control of the processor 1481.

According to various embodiments, although not shown, a switch performing control to electrically connect the first conductive part 1414 implementing the fifth antenna ⑤ to the second conductive part 1424 aligned therewith in the folded state (see FIG. 4) may be further provided. According to various embodiments, although not shown, a switch performing control to electrically connect the first conductive part 1415 implementing the sixth antenna ⑥ to the second conductive part 1425 aligned therewith in the folded state (see FIG. 4) may be further provided.

According to various embodiments, the positions or numbers of the terminals connected to the switch in the first conductive part or the terminals connected to the switch in the second conductive part are not limited to the example shown in FIG. 14, and may be configured differently.

According to various embodiments, the terminal 1411a, 1412a, 1413a, or 1413b of the first side member 1410 may be electrically connected to a printed circuit board (e.g., the first substrate 551 in FIG. 5). According to various embodiments, a flexible conductive member (e.g., a C-clip, a pogo-pin, a spring, conductive poron and rubber, or a conductive tape) may be interposed between the terminal 1411a, 1412a, 1413 a, or 1413b of the first side member 1410 and the printed circuit board. The flexible conductive member may improve the electrical connection between the terminal 1411a, 1412a, 1413a, or 1413b of the first side member 1410 and the printed circuit board.

According to various embodiments, the terminal 1421a, 1422a, 1423a, or 1423b of the second side member 1420 may be electrically connected to a printed circuit board (e.g., the second substrate 552 in FIG. 5). According to various embodiments, a flexible conductive member (e.g., a C-clip, a pogo-pin, a spring, conductive poron and rubber, or a conductive tape) may be interposed between the terminal 1421a, 1422a, 1423a, or 1423b of the second side member 1420 and the printed circuit board. The flexible conductive member may improve the electrical connection between the terminal 1421a, 1422a, 1423a, or 1423b of the second side member 1420 and the printed circuit board.

Referring to FIGS. 13 and 14, in an embodiment, if it is determined that the electronic device 1400 is in the unfolded state, in operation 1305, the processor 1481 (e.g., the processor 1281 in FIG. 12) may control the switch 1482a, 1482b, 1482c, or 1482d to release the electrical connection between the first conductive part 1411, 1412, 1413, 1414, or 1415 of the first side member 1410 and the second conductive part 1421, 1422, 1423, 1424, or 1425 of the second side member 1420.

Figure 15A:
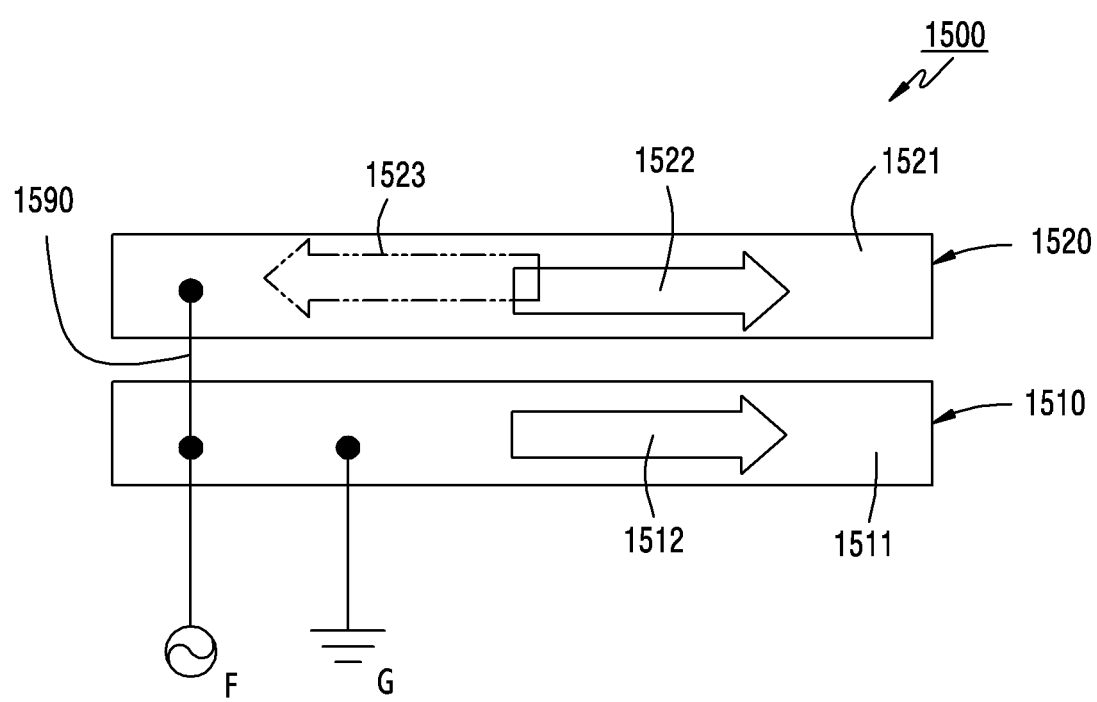
FIG. 15A is a diagram illustrating an electronic device in which a first conductive part of a first side member and a second conductive part of a second side member are electrically connected in a folded state according to an embodiment.
Figure 15B:
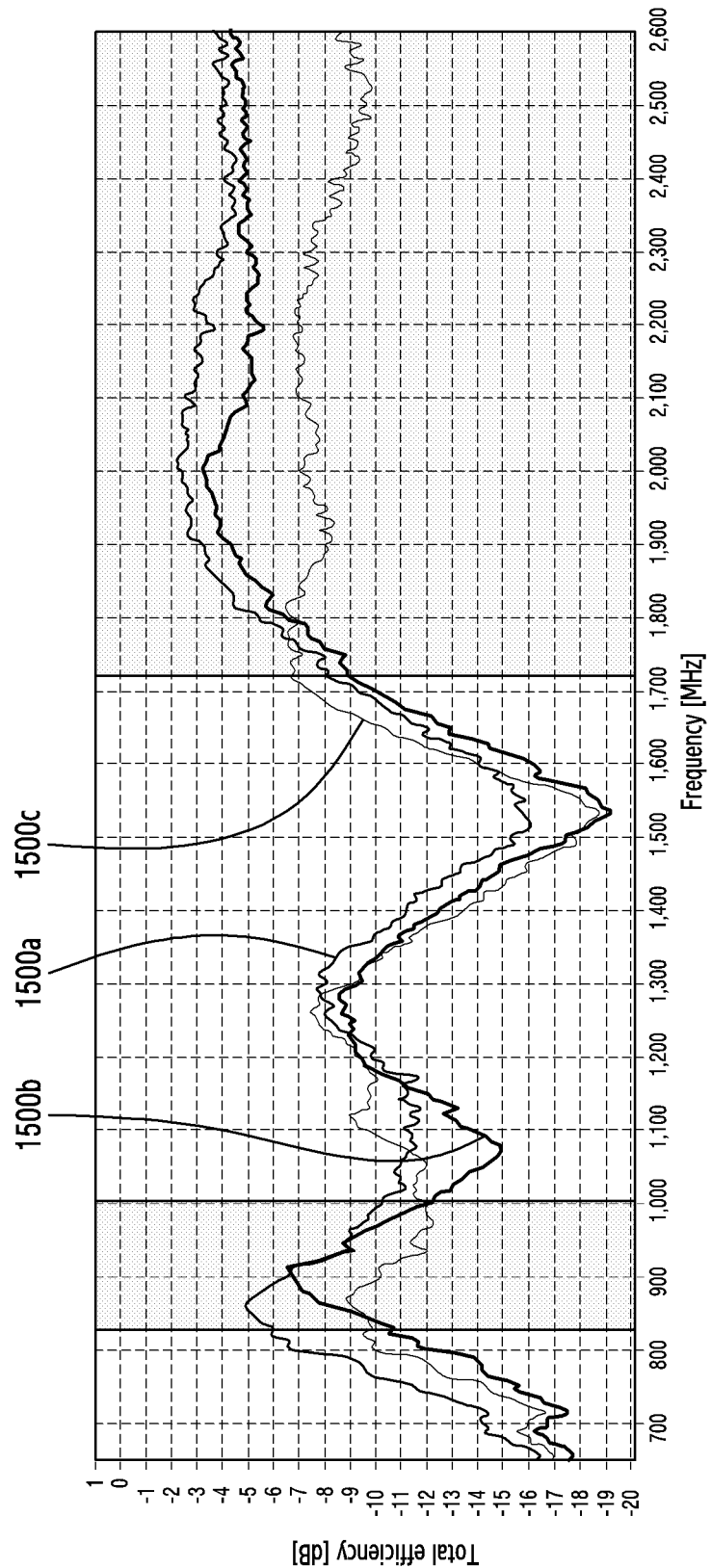
FIG. 15B is a graph showing antenna radiation performance when the electronic device is in an unfolded state or a folded state in FIG. 15A.

FIG. 15A is a diagram illustrating an electronic device in which a first conductive part of a first side member and a second conductive part of a second side member are electrically connected in a folded state according to an embodiment. FIG. 15B is a graph showing antenna radiation performance when the electronic device in FIG. 15A is in an unfolded state or a folded state.

Referring to FIG. 15A, when the electronic device 1500 is in the folded state, a first conductive part 1511 of a first side member 1510 and a second conductive part 1521 of a second side member 1520 may form an angle of about 0 degrees to 10 degrees, or may be spaced 0 mm to 5 mm apart from each other. According to an embodiment, the second conductive part 1521 of the second side member 1520 may be supplied with power F from a wireless communication circuit (e.g., the wireless communication circuit 680 in FIG. 6 or the wireless communication circuit 1240 in FIG. 12), and may be electrically connected to the ground G.

According to an embodiment, an electrical path 1590 for electrically connecting the first conductive part 1511 to the second conductive part 1521 may be formed in the folded state. According to an embodiment, the first conductive part 1511 and the second conductive part 1521 may be electrically connected by a conductive member (e.g., one or more conductive members 640 in FIG. 6) in the folded state. According to some embodiments, the embodiment in FIG. 12 (the structure in which the first conductive part 1210 and the second conductive part 1220 are electrically connected when the folded state of the electronic device 1200 is detected using at least one sensor 1260) may be provided to replace the conductive member. If the second conductive part 1521 and the first conductive part 1511 aligned therewith are electrically connected in the folded state, a forward current 1522 may flow through the second conductive part 1521 as in the first conductive part 1511. As a result, electromagnetic coupling between the second conductive part 1521 and the first conductive part 1511 may be reduced, thereby ensuring configured antenna radiation performance. According to an embodiment, in the folded state, current may flow from the first conductive part 1511 to the second conductive part 1521 through the electrical path 1590, and the second conductive part 1521 may operate as an antenna together with the first conductive part 1511. According to various embodiments, the number or positions of the electrical paths 1590 may be provided in various ways.

For example, assuming that the first conductive part 1511 and the second conductive part 1521 are not electrically connected in the folded state, electromagnetic coupling between the first conductive part 1511 and the second conductive part 1521 may form capacitance therebetween, and the electromagnetic wave energy emitted from the first conductive part 1511 may be induced to the second conductive part 1521. Unlike the forward current 1512 flowing through the first conductive part 1511, a reverse current 1523 may be generated in the second conductive part 1521 by the induced electromagnetic wave energy, and as a result, the antenna radiation performance (or radiation efficiency) may deteriorate in wireless communication using the second conductive part 1521. According to an embodiment, in the folded state, the second conductive part 1521 may operate as a resonator of $\lambda/4$, thereby lowering the radiation performance of the first conductive part 1511.

Referring to FIGS. 15A and 15B, 1500a indicates the antenna radiation performance in the unfolded state, 1500b indicates the antenna radiation performance when the first conductive part 1511 and the second conductive part 1521 are electrically connected in the folded state, and 1500c indicates the antenna radiation performance when the first conductive part 1511 and the second conductive part 1521 are not electrically connected in the folded state of the electronic device 1500. According to an embodiment, in a communication mode utilizing a frequency band of about 800 to 1000 MHz or a frequency band of about 1700 to 2600 MHz, the antenna radiation performance may deteriorate in the folded state compared to the unfolded state. In the folded state in the communication mode utilizing the above frequency band, the antenna radiation performance in the case where the first conductive part 1511 and the second conductive part 1521 are electrically connected may be better than that in the case where the first conductive part 1511 and the second conductive part 1521 are not electrically connected.

According to various embodiments, based on the technical idea of various embodiments of the disclosure, various other rotating types (e.g., slide type, swivel type, etc.) of electronic devices in which at least two housings are rotatably operated by a connection part may be implemented.

According to an embodiment of the disclosure, an electronic device (e.g., the electronic device 30 in FIG. 3) may include a foldable housing (e.g., the foldable housing 300 in FIG. 3). The foldable housing may include a hinge structure (e.g., the hinge structure 501 in FIG. 5), a first housing structure (e.g., the first housing structure 310 in FIG. 3) that is connected to the hinge structure and includes a first surface (e.g., the first surface 3001 in FIG. 3) facing in a first direction (e.g., the first direction 301 in FIG. 3), a second surface (e.g., the second surface 3002 in FIG. 3) facing in a second direction (e.g., the second direction 302 in FIG. 3) opposite the first direction, and a first side member (e.g., the first side member 610 in FIG. 6 or the first side member 1410 in FIG. 14) that surrounds at least a portion of a space between the first surface and the second surface and includes at least one first conductive part (e.g., a plurality of first conductive parts 611a, 611b, 621a, 621b, and 631 in FIG. 6 or at least one first conductive part 1210 in FIG. 12), and a second housing structure (e.g., the second housing structure 320 in FIG. 3) that is connected to the hinge structure and includes a third surface (e.g., the third surface 3003 in FIG. 3) facing in a third direction e.g., the third direction 303 in FIG. 3), a fourth surface (e.g., the fourth surface 3004 in FIG. 3) facing in a fourth direction (e.g., the fourth direction 304 in FIG. 3) opposite the third direction, and a second side member (e.g., the second side member 620 in FIG. 6 or the second side member 1420 in FIG. 14) that surrounds at least a portion of a space between the third surface and the fourth surface and includes at least one second conductive part (e.g., a plurality of second conductive parts 612a, 612b, 622a, 622b, and 632 in FIG. 6 or at least one second conductive part 1220 in FIG. 12). The first surface may face the third surface in a folded state and the third direction may be the same as the first direction in an unfolded state. The electronic device may include a flexible display (e.g., the display 400 in FIG. 3) extending from the first surface to the third surface. The electronic device may include a wireless communication circuit (e.g., the wireless communication circuit 680 in FIG. 6 or the wireless communication circuit 1240 in FIG. 12) that is electrically connected to the at least one first conductive part and is configured to transmit and/or receive a signal of a specified frequency. According to an embodiment, the at least one first conductive part and the at least one second conductive part may be electrically connected to each other in the folded state.

According to an embodiment of the disclosure, the electronic device may further include at least one conductive member (e.g., one or more conductive members 640 in FIG. 6) configured to electrically connect the at least one first conductive part (e.g., a plurality of first conductive parts 611a, 611b, 621a, 621b, and 631 in FIG. 6) and the at least one second conductive part (e.g., a plurality of second conductive parts 612a, 612b, 622a, 622b, and 632 in FIG. 6) between the at least one first conductive part and the at least one second conductive part in the folded state.

According to an embodiment of the disclosure, the first side member (e.g., the first side member 810 in FIG. 8A) may include a first area (e.g., the first area 811 in FIG. 8A) forming a portion of the first surface. The second side member (e.g., the second side member 820 in FIG. 8A) may include a second area (e.g., the second area 821 in FIG. 8A) forming a portion of the third surface. The at least one conductive member (e.g., at least one conductive member 640 in FIG. 6) may electrically connect the first area and the second area in the folded state.

According to an embodiment of the disclosure, the at least one conductive member (e.g., the conductive member 900 in FIG. 8A) may be disposed in the first area (e.g., the first area 811 in FIG. 8A), and may come into contact with the second area (e.g., the second area 821 in FIG. 8A) while facing the same in the folded state.

According to an embodiment of the disclosure, the at least one conductive member (e.g., one or more conductive members 640 in FIG. 6) may have flexibility.

According to an embodiment of the disclosure, the second area (e.g., the second area 821 in FIG. 8A) may have a recess (e.g., the recess 8213 in FIG. 8A) into which the at least one conductive member (e.g., the conductive member 900 in FIG. 8A) is inserted to come into contact with the same in the folded state.

According to an embodiment of the disclosure, a portion other than the portion (e.g., the uncoated area 8212 in FIG. 8A) in contact with the at least one conductive member (e.g., the conductive member 900 in FIG. 8A) in the second area (e.g., the second area 821 in FIG. 8A) may include a coating layer (e.g., the coating layer 8211 in FIG. 8A).

According to an embodiment of the disclosure, the coating layer (e.g., the coating layer 8211 in FIG. 8A) may include an anodized layer.

According to an embodiment of the disclosure, the at least one conductive member (e.g., the conductive member 900 in FIG. 8A) may be disposed in a recess (e.g., the recess 8112 or 8113 in FIG. 8A) formed in the first area (e.g., the first area 811 in FIG. 8A).

According to an embodiment of the disclosure, the electronic device may further include a flexible member (e.g., the first flexible member 930 or the second flexible member 950 in FIG. 8A) disposed together with the at least one conductive member (e.g., the conductive member 900 in FIG. 8A) in the recess (e.g., the recess 8112 or 8113 in FIG. 8A).

According to an embodiment of the disclosure, the electronic device may further include a conductive adhesion member (e.g., the conductive adhesion member 940 in FIG. 8A) disposed between the at least one conductive member (e.g., the conductive member 900 in FIG. 8A) and the first area (e.g., the second area 811 in FIG. 8A) in the recess (e.g., the recess 8112 or 8113 in FIG. 8A).

According to an embodiment of the disclosure, the at least one first conductive part may include a plurality of first conductive parts that are physically separated by insulating members interposed therebetween, and the at least one second conductive part may include a plurality of second conductive parts that are physically separated by insulating members interposed therebetween, and the plurality of first conductive parts (e.g., a plurality of first conductive parts 611a, 611b, 621a, 621b, and 631 in FIG. 6) and the plurality of second conductive parts (e.g., a plurality of second conductive parts 612a, 612b, 622a, 622b, and 632 in FIG. 6) may be aligned in the folded state.

According to an embodiment of the disclosure, the at least one second conductive part (e.g., a plurality of second conductive parts 612a, 612b, 622a, 622b, and 632 in FIG. 6) may be in an electrically floating state in the unfolded state.

According to an embodiment of the disclosure, the electronic device may further include the ground (e.g., the ground G in FIG. 6) disposed inside the first housing structure and electrically connected to the at least one first conductive part (e.g., a plurality of first conductive parts 611a, 611b, 621a, 621b, and 631 in FIG. 6).

According to an embodiment of the disclosure, the hinge structure (e.g., the hinge structure 630 in FIG. 6) may include at least one third conductive part electrically connected to the wireless communication circuit (e.g., the wireless communication circuit 680 in FIG. 6).

According to an embodiment of the disclosure, the first side member (e.g., the first side member 311 in FIG. 3) may be connected to the second surface (e.g., the second surface 3002 in FIG. 3), or may be integrally formed with the second surface. The second side member (e.g., the second side member 321 of FIG. 3) may be connected to the fourth surface (e.g., the fourth surface 3004 of FIG. 3), or may be integrally formed with the fourth surface.

According to an embodiment of the disclosure, the electronic device may further include a switch (e.g., the switch 1282 in FIG. 12) configured to electrically connect the at least one first conductive part (e.g., at least one first conductive part 1210 in FIG. 12) with the at least one second conductive part (e.g., at least one second conductive part 1220 in FIG. 12) in the folded state.

According to an embodiment of the disclosure, the electronic device may further include a processor electrically connected to the flexible display, the wireless communication circuit, and the switch. The processor may determine the folded state or the unfolded state, based on information obtained from at least one sensor disposed in the electronic device, and may control the switch.

According to an embodiment of the disclosure, the at least one first conductive part (e.g., the first conductive part 1411, 1412, 1413, 1414, or 1415 in FIG. 14) may include a first terminal (e.g., the terminal 1411a, 1412a, 1413a, or 1413b in FIG. 14) electrically connected to the switch (e.g., the switch 1482a, 1482b, 1482c, or 1482d in FIG. 14) at a first position of the at least one first conductive part. The at least one second conductive part (e.g., the second conductive part 1421, 1422, 1423, 1424, or 1425 in FIG. 14) may include a second terminal (e.g., the terminal 1421a, 1422a, 1423a, or 1423b) electrically connected to the switch at a second position of the at least one second conductive part. The first position and the second position may be aligned in the folded state.

According to an embodiment of the disclosure, the first terminal (e.g., the terminal 1411a, 1412a, 1413a, or 1413b in FIG. 14) may extend to protrude from the inner side of the at least one first conductive part, and the second terminal (e.g., the terminal 1421a, 1422a, 1423a, or 1423b in FIG. 14) may extend to protrude from the inner side of the at least one second conductive part.

The embodiments of the disclosure disclosed in this specification and drawings are merely provided as specific examples in order to easily explain the technical content according to the embodiments of the disclosure and in order to assist in understanding the embodiments of the disclosure, and are not intended to limit the scope of the embodiments of the disclosure. Therefore, the scope of various embodiments of the disclosure should be interpreted to encompass all changes or modifications derived based on the technical idea of various embodiments of the disclosure, as well as the embodiments disclosed herein.

The invention claimed is:

1. An electronic device comprising:
   a foldable housing comprising:
      a hinge structure,
      a first housing structure connected to the hinge structure and comprising a first surface facing in a first direction, a second surface facing in a second direction opposite the first direction, and a first side member surrounding at least a portion of a space between the first surface and the second surface and comprising at least one first conductive part, and
      a second housing structure connected to the hinge structure, comprising a third surface facing in a third direction, a fourth surface facing in a fourth direction opposite the third direction, and a second side member surrounding at least a portion of a space between the third surface and the fourth surface and comprising at least one second conductive part, and configured to be folded against the first housing structure around the hinge structure, wherein the first surface faces the third surface in a folded state and the third direction is the same as the first direction in an unfolded state;
   a flexible display extending from the first surface to the third surface; and
   a wireless communication circuit electrically connected to the at least one first conductive part and configured to transmit and/or receive a signal of a specified frequency,
   wherein the at least one first conductive part and the at least one second conductive part are electrically connected to each other in the folded state,
   wherein the electronic device further comprises at least one conductive member configured to electrically connect the at least one first conductive part and the at least one second conductive part between the at least one first conductive part and the at least one second conductive part in the folded state,
   wherein the first side member comprises a first area forming a portion of the first surface,
   wherein the second side member comprises a second area forming a portion of the third surface,
   wherein the at least one conductive member electrically connects the first area and the second area in the folded state,
   wherein the at least one conductive member is disposed in the first area and comes into contact with the second area while facing the same in the folded state, and
   wherein the second area has a recess into which the at least one conductive member is inserted to come into contact with the same in the folded state.

2. The electronic device of claim 1, wherein the at least one conductive member has flexibility.

3. The electronic device of claim 1, wherein a portion other than the portion in contact with the at least one conductive member in the second area comprises an anodized layer.

4. The electronic device of claim 1, wherein the at least one conductive member is disposed in a recess formed in the first area.

5. The electronic device of claim 4, further comprising a flexible member disposed together with the at least one conductive member in the recess.

6. The electronic device of claim 4, further comprising a conductive adhesion member disposed between the at least one conductive member and the first area in the recess.

7. The electronic device of claim 1,
   wherein the at least one first conductive part comprises a plurality of first conductive parts that are physically separated by insulating members interposed therebetween,
   wherein the at least one second conductive part comprises a plurality of second conductive parts that are physically separated by insulating members interposed therebetween, and
   wherein the plurality of first conductive parts and the plurality of second conductive parts are aligned in the folded state.

8. The electronic device of claim 1, wherein the at least one second conductive part is in an electrically floating state in the unfolded state.

9. The electronic device of claim 1, wherein the hinge structure comprises at least one third conductive part electrically connected to the wireless communication circuit.

10. The electronic device of claim 1, further comprising:
    a switch configured to electrically connect the at least one first conductive part with the at least one second conductive part in the folded state; and
    a processor electrically connected to the flexible display, the wireless communication circuit, and the switch,
    wherein the processor is configured to determine the folded state or the unfolded state, based on information obtained from at least one sensor disposed in the electronic device, and to control the switch.

11. The electronic device of claim 10,
wherein the at least one first conductive part comprises a first terminal electrically connected to the switch at a first position of the at least one first conductive part,
wherein the at least one second conductive part comprises a second terminal electrically connected to the switch at a second position of the at least one second conductive part, and
wherein the first position and the second position are aligned in the folded state.

* * * * *